United States Patent
Chen et al.

(10) Patent No.: US 12,126,023 B2
(45) Date of Patent: Oct. 22, 2024

(54) HARD CARBON, METHOD FOR PREPARING SAME, SECONDARY BATTERY COMPRISING SAME, AND ELECTRICAL APPARATUS COMPRISING SAME

(71) Applicant: CONTEMPORARY AMPEREX TECHNOLOGY (HONG KONG) LIMITED, Hong Kong (CN)

(72) Inventors: Xiaoxia Chen, Ningde (CN); Xinxin Zhang, Ningde (CN); Chuying Ouyang, Ningde (CN); Yongsheng Guo, Ningde (CN); Jiarui Tian, Ningde (CN); Yu Ma, Ningde (CN); Ben Liu, Ningde (CN); Xiaoji Zheng, Ningde (CN)

(73) Assignee: CONTEMPORARY AMPEREX TECHNOLOGY (HONG KONG) LIMITED, Hongkong (CN)

( * ) Notice: Subject to any disclaimer, the term of this patent is extended or adjusted under 35 U.S.C. 154(b) by 0 days.

(21) Appl. No.: 18/469,449

(22) Filed: Sep. 18, 2023

(65) Prior Publication Data
US 2024/0014394 A1 Jan. 11, 2024

Related U.S. Application Data

(63) Continuation of application No. PCT/CN2021/143486, filed on Dec. 31, 2021.

(51) Int. Cl.
*H01M 4/583* (2010.01)
*C01B 32/05* (2017.01)
*H01M 4/02* (2006.01)

(52) U.S. Cl.
CPC .............. *H01M 4/583* (2013.01); *C01B 32/05* (2017.08); *C01P 2002/72* (2013.01);
(Continued)

(58) Field of Classification Search
CPC .......... H01M 4/583; H01M 2004/021; H01M 2004/027; H01M 2220/20; H01M 4/02;
(Continued)

(56) References Cited

U.S. PATENT DOCUMENTS

| 2013/0252082 A1* | 9/2013 | Thompkins | H01M 4/587 |
| | | | 429/188 |
| 2017/0133680 A1 | 5/2017 | Cheng et al. | |
| 2021/0253427 A1 | 8/2021 | Hu et al. | |

FOREIGN PATENT DOCUMENTS

| CN | 105247713 A | 1/2016 |
| CN | 108584907 A | 9/2018 |

(Continued)

OTHER PUBLICATIONS

The World Intellectual Property Organization (WIPO) International Search Report and Written Opinion for PCT/CN2021/143486 Sep. 28, 2022 12 pages (including English translation).
(Continued)

*Primary Examiner* — Daniel S Gatewood
(74) *Attorney, Agent, or Firm* — ANOVA LAW GROUP, PLLC

(57) ABSTRACT

A hard carbon. A total quantity of adsorbed nitrogen under a relative pressure $P/P_0$ of nitrogen between $10^{-8}$ and 0.035 is $V_1$ cm$^3$ (STP)/g and a total quantity of adsorbed nitrogen under a relative pressure P/Po of nitrogen between 0.035 and 1 is $V_2$ cm$^3$ (STP)/g in a nitrogen adsorption isotherm determined at a temperature of 77 K for the hard carbon. The hard carbon satisfies: $V_2/V_1 \leq 0.20$ and $20 \leq V_1 \leq 150$, where P represents an actual pressure of nitrogen, and $P_0$ represents a saturated vapor pressure of nitrogen at a temperature of 77 K.

19 Claims, 5 Drawing Sheets

(52) U.S. Cl.
CPC ...... *C01P 2002/82* (2013.01); *C01P 2004/03* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/027* (2013.01); *H01M 2220/20* (2013.01)

(58) Field of Classification Search
CPC .... H01M 4/133; C01B 32/05; C01P 2002/72; C01P 2002/82; C01P 2004/03; C01P 2004/61; C01P 2006/11; C01P 2006/12; C01P 2006/40; C01P 2006/14; Y02E 60/10
See application file for complete search history.

(56) References Cited

FOREIGN PATENT DOCUMENTS

| | | | |
|---|---|---|---|
| CN | 111847418 | A | 10/2020 |
| CN | 112811409 | A | 5/2021 |
| CN | 113044827 | A | 6/2021 |
| CN | 113437294 | A | 9/2021 |
| EP | 4160727 | A1 | 4/2023 |
| JP | 2018514936 | A | 6/2018 |
| JP | 2021066629 | A | 4/2021 |
| WO | 2015146900 | A1 | 10/2015 |
| WO | 2016074479 | A1 | 5/2016 |
| WO | 2020017553 | A1 | 1/2020 |
| WO | 2020189520 | A1 | 9/2020 |
| WO | 2021241747 | A1 | 12/2021 |

OTHER PUBLICATIONS

The European Patent Office (EPO) The Extended European Search Report for Application No. 21969660.6 Apr. 15, 2024 8 Pages.

The Japan Patent Office (JPO) Notification of Reasons for Refusal for Application No. 2023-531034 and Translation Jan. 29, 2024 8 Pages.

The Japan Patent Office (JPO) Notification of Reasons for Refusal for Application No. 2023-531034 Jul. 1, 2024 8 Pages (including translation).

Naoya Miyajima et al. "Pore structures and ethylene adsorption behavior of polysaccharide-derived carbons." Carbon 50.2 (2012): 737-738.

* cited by examiner

HARD CARBON, METHOD FOR PREPARING SAME, SECONDARY BATTERY COMPRISING SAME, AND ELECTRICAL APPARATUS COMPRISING SAME

CROSS-REFERENCE TO RELATED APPLICATION

This application is a continuation of International Application No. PCT/CN2021/143486, filed on Dec. 31, 2021, the entire content of which is incorporated herein by reference.

TECHNICAL FIELD

The present application relates to the technical field of batteries, and specifically relates to a hard carbon, a method for preparing the same, a secondary battery comprising the same, and an electrical apparatus comprising the same.

BACKGROUND ART

In recent years, secondary batteries are widely applied in energy storage power source systems, such as water, fire, wind, and solar power stations, as well as many fields, such as electric tools, electric bicycles, electric motorcycles, electric vehicles, military equipment, and aerospace. With the application and promotion of the secondary batteries, their energy density, service life and rate performance have attracted more and more attention. Graphite is a most commonly used negative electrode active material for secondary batteries, but has a theoretical gram capacity of only 372 mAh/g and a very limited space for improving the energy density. Further, graphite has a small interlayer spacing, and limited improvement on the rate performance. As a novel negative electrode active material, a hard carbon is capable of achieving rapid intercalation and deintercalation of active ions during the charge-discharge of the secondary batteries, and therefore has a very broad development prospect. However, the hard carbon has low capacity and low first coulomb efficiency, thus having limited improvement on the energy density, service life, and rate performance of the secondary batteries.

SUMMARY

An object of the present application is to provide a hard carbon, a method for preparing the same, a secondary battery comprising the same, and an electrical apparatus comprising the same, so as to improve both capacity and first coulomb efficiency of the hard carbon.

A first aspect of the present application provides a hard carbon, where a total quantity of adsorbed nitrogen under a relative pressure $P/P_0$ of nitrogen between $10^{-8}$ and 0.035 is $V_1$ cm$^3$ (STP)/g and a total quantity of adsorbed nitrogen under a relative pressure $P/P_0$ of nitrogen between 0.035 and 1 is $V_2$ cm$^3$ (STP)/g in a nitrogen adsorption isotherm determined at a temperature of 77 K for the hard carbon, and the hard carbon satisfies: $V_2/V_1 \leq 0.20$ and $20 \leq V_1 \leq 150$, where P represents an actual pressure of nitrogen, and $P_0$ represents a saturated vapor pressure of nitrogen at a temperature of 77 K.

Compared with the currently commercialized hard carbon, the hard carbon provided in the present application achieves both high capacity and high first coulomb efficiency. While the mechanism is still unclear, the inventor infers that a possible reason is that the hard carbon in the present application has a moderate number of internal defects, a unique pore channel structure, many active ion storage sites, and a high utilization. Therefore, the hard carbon structure in the present application is capable of facilitating the intercalation, storage, and deintercalation of active ions, and is capable of achieving both high capacity and first coulomb efficiency.

In any embodiment of the present application, $50 \leq V_1 \leq 150$. Optionally, $70 \leq V_1 \leq 150$. When $V_1$ is within an appropriate range, the hard carbon provided in the present application can have both higher capacity and higher first coulomb efficiency.

In any embodiment of the present application, $0.05 \leq V_2/V_1 \leq 0.20$. Optionally, $0.08 \leq V_2/V_1 \leq 0.20$. When $V_2/V_1$ is within an appropriate range, the hard carbon can have both higher capacity and higher first coulomb efficiency.

In any embodiment of the present application, $4 \leq V_2 \leq 30$. Optionally, $6 \leq V_2 \leq 30$. When $V_2$ is within an appropriate range, the hard carbon not only can have higher capacity and higher first coulomb efficiency, but also can have outstanding rate performance.

In any embodiment of the present application, in a Raman spectrum of the hard carbon, $I_d/I_g$ is from 1.20 to 1.32, where $I_d$ represents d peak intensity of a Raman shift in a range of $1,350\pm50$ cm$^{-1}$, and $I_g$ represents g peak intensity of the Raman shift in a range of $1,580\pm50$ cm$^{-1}$. In this case, the hard carbon structure has a moderate degree of order, such that the hard carbon not only has higher capacity and higher first coulomb efficiency, but also has outstanding rate performance.

In any embodiment of the present application, in an X-ray diffraction pattern of the hard carbon, a 2θ value corresponding to peak 002 is between 22° and 24°.

In any embodiment of the present application, a volumetric particle size Dv50 of the hard carbon is from 2 μm to 15 μm; and is optionally from 4 μm to 8 μm.

In any embodiment of the present application, a volumetric particle size Dv90 of the hard carbon is from 5 μm to 25 μm; and is optionally from 8 μm to 15 μm.

The volumetric particle size Dv50 and/or Dv90 of the hard carbon within an appropriate range contributes to improving the transport performance of active ions and electrons, thereby further improving the rate performance of the secondary battery.

In any embodiment of the present application, a specific surface area of the hard carbon is less than or equal to 5 m$^2$/g; and is optionally from 0.5 m$^2$/g to 5 m$^2$/g. When the specific surface area of the hard carbon is within an appropriate range, the hard carbon not only can have both higher capacity and higher first coulomb efficiency, but also can have better rate performance. In addition, when the specific surface area of the hard carbon is within the appropriate range, the hard carbon can further have a strong bonding force to a binder, thereby improving the cohesion and bonding force of a negative electrode sheet, reducing the volume expansion of the negative electrode sheet in the cycle process, and making the secondary battery have better cycling performance.

In any embodiment of the present application, a powder compaction density of the hard carbon under a force of 50,000 N is from 0.96 g/cm$^3$ to 1.05 g/cm$^3$. When the powder compaction density of the hard carbon is within an appropriate range, the compaction density of the negative electrode sheet can be improved, thereby improving the energy density of the secondary battery.

In any embodiment of the present application, a tap density of the hard carbon is from 0.80 g/cm$^3$ to 0.95 g/cm$^3$. When the tap density of the hard carbon is within an appropriate range, the compaction density of the negative electrode sheet can be improved, thereby improving the energy density of the secondary battery.

A second aspect of the present application provides a method for preparing a hard carbon, including the following steps: S10: providing a carbon source; S20: heat treating the carbon source in an inert atmosphere at a first temperature T1 for a duration of t1 to obtain a first intermediate product; S30: heat treating the resulting first intermediate product in an air atmosphere at a second temperature T2 for a duration of t2 to obtain a second intermediate product; and S40: carbonizing the resulting second intermediate product in an inert atmosphere at a third temperature T3 for a duration of t3 to obtain the hard carbon, where a total quantity of adsorbed nitrogen under a relative pressure $P/P_0$ of nitrogen between $10^{-8}$ and 0.035 is $V_1$ cm$^3$ (STP)/g and a total quantity of adsorbed nitrogen under a relative pressure $P/P_0$ of nitrogen between 0.035 and 1 is $V_2$ cm$^3$ (STP)/g in a nitrogen adsorption isotherm determined at a temperature of 77 K for the hard carbon, and the hard carbon satisfies: $V_2/V_1 \leq 0.20$ and $20 \leq V_1 \leq 150$, where P represents an actual pressure of nitrogen, and $P_0$ represents a saturated vapor pressure of nitrogen at a temperature of 77 K.

The inventor was surprised to find that the hard carbon obtained through a low-temperature heat treatment process in an inert atmosphere, two low-temperature heat treatment processes in an air atmosphere, and a high-temperature carbonization process in an inert atmosphere of the carbon source is capable of having both high capacity and high first coulomb efficiency. The method for preparing a hard carbon provided in the present application is simple and adapted to commercial production.

In any embodiment of the present application, T1<T3, and T2<T3.

In any embodiment of the present application, T1≤T2; and optionally, T1<T2.

In any embodiment of the present application, T1≤300° C.; and optionally, T1 is from 180° C. to 300° C. When T1 is within an appropriate range, many skeleton structures that are adapted to introducing an appropriate pore channel structure, are stable, and are uncollapsable can be retained.

In any embodiment of the present application, T2<400° C.; and optionally, T2 is from 270° C. to 380° C. When T2 is within an appropriate range, appropriate and abundant pore channel structures can be formed from inside to outside of the carbon skeleton material particles obtained in S20, to improve the transport performance of active ions and electrons, and then improve the capacity and the first coulomb efficiency of the hard carbon.

In any embodiment of the present application, T3 is from 1,000° C. to 1,600° C.; and optionally, T3 is from 1,000° C. to 1,400° C. When T3 is within an appropriate range, a degree of order of the hard carbon can be better improved, such that the hard carbon has both high capacity and high first coulomb efficiency.

In any embodiment of the present application, t1 is from 4 h to 60 h.

In any embodiment of the present application, t2 is from 1 h to 12 h.

In any embodiment of the present application, t3 is from 1 h to 12 h.

In any embodiment of the present application, after S20 and prior to S30, the preparation method further includes: S21: crushing the first intermediate product obtained in S20, to guarantee full contact between the first intermediate product and air in subsequent treatment.

In any embodiment of the present application, after S30 and prior to S40, the preparation method further includes: S31: crushing the second intermediate product obtained in S30. Optionally, a volumetric particle size of the crushed second intermediate product satisfies: Dv50 is from 2 μm to 15 μm, and/or, Dv90 is from 5 μm to 25 μm.

In any embodiment of the present application, the preparation method further includes: S50: crushing the hard carbon obtained in S40, such that the hard carbon satisfies a required particle size, to facilitate preparing a negative electrode slurry and a negative electrode sheet.

In any embodiment of the present application, the inert atmosphere is one or more selected from a nitrogen atmosphere and an argon atmosphere.

In any embodiment of the present application, the carbon source includes one or more of a polymer, a resin, and a biomass material.

In any embodiment of the present application, the polymer includes one or more of polyaniline and polypyrrole.

In any embodiment of the present application, the resin includes one or more of a phenolic resin and an epoxy resin.

In any embodiment of the present application, the biomass material includes one or more of starch, glucose, fructose, maltose, sucrose, cellulose, hemicellulose, and lignin. Optionally, the starch includes one or more of cereal starch, tuber starch, and bean starch.

A third aspect of the present application provides a secondary battery, comprising a negative electrode sheet, where the negative electrode sheet comprises the hard carbon in the first aspect of the present application or the hard carbon prepared in accordance with the method in the second aspect of the present application.

A fourth aspect of the present application provides an electrical apparatus, comprising the secondary battery in the third aspect of the present application.

The electrical apparatus in the present application comprises the secondary battery provided in the present application, and thus has at least the same advantages as the secondary battery.

DESCRIPTION OF DRAWINGS

In order to more clearly illustrate the technical solutions in embodiments of the present application, the accompanying drawings to be used in the embodiments of the present application will be briefly introduced below. Apparently, the drawings described below are merely some embodiments of the present application. For those of ordinary skills in the art, other drawings may also be obtained based on these drawings without making creative work.

Figure 1:
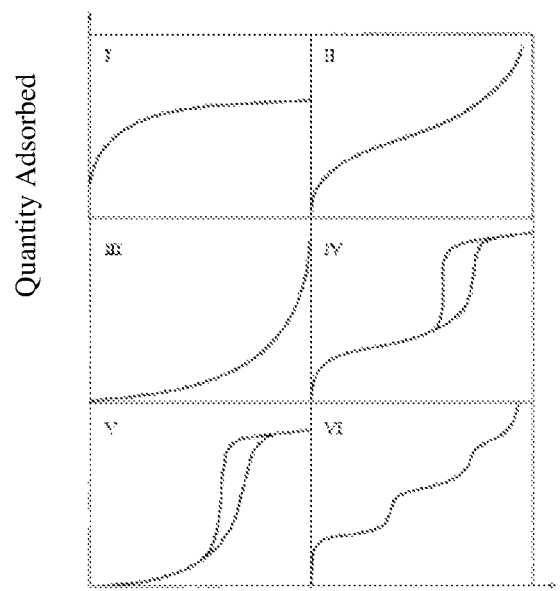
FIG. 1 shows six common types of adsorption isotherms of a solid material.

In the drawings, the figures may not be drawn to the actual scale.

DETAILED DESCRIPTION

Embodiments of a hard carbon, a method for preparing the same, a secondary battery comprising the same, and an electrical apparatus comprising the same in the present application are specifically disclosed in detail below properly with reference to the detailed description of the drawings. However, there will be cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if a range of 60-120 and 80-110 is listed for a particular parameter, it is understood that a range of 60-110 and 80-120 is also expected. Additionally, if the minimum range values 1 and 2 are listed, and if the maximum range values 3, 4, and 5 are listed, the following ranges are all contemplated: 1 to 3, 1 to 4, 1 to 5, 2 to 3, 2 to 4 and 2 to 5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specifically stated, all embodiments and optional embodiments of the present application may be combined with each other to form new technical solutions, and such technical solutions should be considered as being included in the disclosure of the present application.

Unless otherwise specifically stated, all technical features and optional technical features of the present application may be combined with each other to form new technical solutions, and such technical solutions should be considered as being included in the disclosure of the present application.

Unless otherwise specifically stated, all steps in the present application may be performed sequentially or randomly, and are in some embodiments performed sequentially. For example, the method includes steps (a) and (b), indicating that the method may include steps (a) and (b) performed sequentially, or may include steps (b) and (a) performed sequentially. For example, reference to the method may further include step (c), indicating that step (c) may be added to the method in any order, e.g., the method may include steps (a), (b), and (c), or may include steps (a), (c), and (b), or may include steps (c), (a), and (b) and the like.

Unless otherwise specifically stated, the "including" and "comprising" mentioned in the present application mean open-ended. For example, the "including" and "comprising" may indicate that it is possible to include or comprise other components not listed.

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present). In this disclosure, the phrases "at least one of A, B, and C" and "at least one of A, B, or C" both mean only A, only B, only C, or any combination of A, B, and C.

Unless otherwise specially noted, the term "active ion" in the present application refers to an ion that can be intercalated and deintercalated back and forth between positive and negative electrodes of a secondary battery, including but not limited to a lithium ion, a sodium ion, and the like.

According to the definitions provided by the International Union of Pure and Applied Chemistry (IUPAC), a micropore refers to a pore with a pore size <2 nm, a mesopore refers to a pore with a pore size from 2 nm to 50 nm, and a macropore refers to a pore with a pore size >50 nm. In the context of the present application, the term "micropore" refers to a pore with a pore size <2 nm; the term "mesopore" refers to a pore with a pore size from 2 nm to 50 nm; and the term "macropore" refers to a pore with a pore size >50 nm. In the context of the present application, the terms "large pore" and "small pore" represent relative concepts.

Secondary battery, also known as a rechargeable battery or storage battery, refers to a battery that can be re-used by activating its active material by charging after the battery is discharged. In general, the secondary battery comprises a positive electrode sheet, a negative electrode sheet, a separator, and an electrolyte. During charge-discharge of the battery, active ions are intercalated and deintercalated back and forth between the positive electrode sheet and the negative electrode sheet. The separator is arranged between the positive electrode sheet and the negative electrode sheet, mainly to serve for preventing short circuit between the positive and negative electrodes, and making the active ions pass through. The electrolyte serves for conducting the active ions between the positive electrode sheet and the negative electrode sheet. At present, secondary batteries are widely applied in energy storage power source systems, such as water, fire, wind, and solar power stations, as well as many fields, such as electric tools, electric bicycles, electric motorcycles, electric vehicles, military equipment, and aerospace.

With the application and promotion of the secondary batteries, their energy density, service life and rate performance have attracted more and more attention. The performance of a negative electrode active material determines the energy density, service life, and safety of the secondary batteries to a certain extent. Graphite (including natural graphite and artificial graphite) is a most commonly used negative electrode active material for secondary batteries, but has a theoretical gram capacity of only 372 mAh/g and a very limited space for improving the energy density. Further, graphite has a small interlayer spacing and limited improvement of the rate performance, thereby failing to satisfy the actual requirements of secondary batteries with high rate performance.

Hard carbon refers to a carbon that is difficult to graphitize, and is still difficult to graphitize even at a high temperature of above 2,500° C. The hard carbon is a kind of carbon material having a complex structure and presenting a graphite microcrystalline structure, in which the graphite microcrystal is irregularly arranged with a small number of graphite microcrystalline wafers, and edges of the wafers may be cross-linked. The hard carbon structure further includes an amorphous region, where the amorphous region mainly includes micropores, defects, sp3-hybridized carbon atoms, carbon chains, some functional groups, and the like. Therefore, a plurality of active ion storage sites may be present in the hard carbon structure, e.g., graphite microcrystalline surface, graphite microcrystalline interlayer, graphite microcrystalline wafer edge, and micropores and the like.

Compared with the graphite, the hard carbon has a larger interlayer spacing and a more abundant micropore structure, thereby contributing to the storage, rapid intercalation and deintercalation of the active ions, such that the secondary battery has outstanding low-temperature performance, power performance, and safety performance, and especially in the field of power batteries, the hard carbon has unique advantages. However, at present, most commercialized hard carbon belongs to a low-capacity ordinary hard carbon with low capacity and low first coulomb efficiency, for example, the capacity is usually between 200 mAh/g and 280 mAh/g, and the first coulomb efficiency is usually lower than 80%, thereby resulting in severe restrictions on its practical application.

Therefore, how to improve both the capacity and the first coulomb efficiency of the hard carbon is still a technical problem to be urgently solved at present.

In view of this, the first aspect of the embodiments of the present application provides a hard carbon, which achieves both high capacity and high first coulomb efficiency, and enables the secondary battery to have high energy density, long service life, and outstanding rate performance.

A total quantity of adsorbed nitrogen under a relative pressure $P/P_0$ of nitrogen between $10^{-8}$ and 0.035 is $V_1$ cm$^3$ (STP)/g and a total quantity of adsorbed nitrogen under a relative pressure $P/P_0$ of nitrogen between 0.035 and 1 is $V_2$ cm$^3$ (STP)/g in a nitrogen adsorption isotherm determined at a temperature of 77 K for the hard carbon in the first aspect of the embodiments of the present application, and the hard carbon satisfies: $V_2/V_1 \leq 0.20$ and $20 \leq V_1 \leq 150$, where P represents an actual pressure of nitrogen, and $P_0$ represents a saturated vapor pressure of nitrogen at a temperature of 77 K.

The above K is a standard Kelvin temperature unit, and 77 K represents a liquid nitrogen temperature.

When a gas molecule moves to a surface of a solid material, due to an interaction (e.g., van der Waals force or chemical bond and the like) between the gas molecule and a molecule on the surface of the solid material, the gas molecule will temporarily stay on the solid surface, thus increasing the gas molecule concentration on the surface of the solid material. This phenomenon is referred to as adsorption of the gas molecule on the surface of the solid material. The gas may be referred to as an adsorbate, and the solid material may be referred to as an adsorbent. The adsorption isotherm refers to a relationship curve between concentrations of the adsorbate in two phases when the adsorption process of the adsorbate (e.g., the gas) on the two-phase interface (e.g., the interface between the gas and the solid material) reaches equilibrium at a certain temperature. Types of the adsorption isotherm vary with the pore channel structure of the solid material. FIG. 1 shows six common types of adsorption isotherms of a solid material.

A total quantity of adsorbed nitrogen $V_1$ cm$^3$ (STP)/g under a relative pressure $P/P_0$ of nitrogen between $10^{-8}$ and 0.035 and a total quantity of adsorbed nitrogen $V_2$ cm$^3$ (STP)/g under a relative pressure $P/P_0$ of nitrogen between 0.035 and 1 in a nitrogen adsorption isotherm determined at a temperature of 77 K for the hard carbon in the present application satisfy: $V_2/V_1 \leq 0.20$. Therefore, the adsorption process of the hard carbon in the present application mainly occurs at a stage with a low relative pressure, i.e., $P/P_0$ between $10^{-8}$ and 0.035. Further, when the relative pressure of nitrogen $P/P_0$ is from $10^{-8}$ to 0.035, the total quantity of adsorbed nitrogen $V_1$ of the hard carbon in the present application is between 20 cm$^3$ (STP)/g and 150 cm$^3$ (STP)/g.

Compared with the currently commercialized hard carbon, the hard carbon provided in the present application achieves both high capacity and high first coulomb efficiency. While the mechanism is still unclear, the inventor infers that a possible reason is that the hard carbon in the present application has a moderate number of internal defects, a unique pore channel structure, many active ion storage sites, and a high utilization. Therefore, the hard carbon structure in the present application is capable of facilitating the intercalation, storage, and deintercalation of active ions, and is capable of achieving both high capacity and first coulomb efficiency.

At present, a total quantity of adsorbed nitrogen $V_1$ cm$^3$ (STP)/g under a relative pressure $P/P_0$ of nitrogen between $10^{-8}$ and 0.035 and a total quantity of adsorbed nitrogen $V_2$ cm$^3$ (STP)/g under a relative pressure $P/P_0$ of nitrogen between 0.035 and 1 in a nitrogen adsorption isotherm determined at the temperature of 77 K for a commercialized hard carbon fail to satisfy: $V_2/V_1 \leq 0.20$. The possible reasons are that the commercialized hard carbon has many internal defects, an unreasonable pore channel structure, or few micropore structures, fails to provide many active ion storage sites, and has a low utilization of the few active ion storage sites. Further, the commercialized hard carbon may comprise a high content of a mesopore or macropore structure, thus resulting in a high proportion of an electrolyte solution infiltrated region inside the hard carbon. The inventor further finds by studies that the higher the ratio of $V_2$ to $V_1$ in the adsorption isotherm is, the higher the proportion of the electrolyte solution infiltrated region inside the hard carbon is, the higher the first irreversible capacity loss of the hard carbon is, and the lower the first coulomb efficiency is.

In addition, when the relative pressure $P/P_0$ of nitrogen is from $10^{-8}$ to 0.035, the total quantity of adsorbed nitrogen of the hard carbon is less than 20 cm$^3$ (STP)/g. In this case, the hard carbon has an underdeveloped pore channel structure and a very low specific surface area, fails to provide many active ion storage sites, and thus has a low gram capacity. Further, due to the undeveloped pore channel structure of the hard carbon, the active ions stored at the storage sites can hardly be deintercalated, so that the hard carbon has a low first coulomb efficiency.

When the relative pressure $P/P_0$ of nitrogen is from $10^{-8}$ to 0.035, the total quantity of adsorbed nitrogen of the hard carbon is greater than 150 cm$^3$ (STP)/g, and the hard carbon structure becomes fragile, so that the internal pore channel structure may be extremely easily collapsed to cause pore merging, thus resulting in a very high proportion of mesopore or macropore structure inside the hard carbon, and easily resulting in infiltration of a large amount of electrolyte solution. Therefore, while the hard carbon can provide many active ion storage sites and high gram capacity, some active ions stored at the active ion storage sites cannot be deintercalated due to a very complex structure of the hard carbon, so that the hard carbon has a low first coulomb efficiency.

When the relative pressure of nitrogen $P/P_0$ is between $10^{-8}$ and 0.035, the total quantity of adsorbed nitrogen $V_1$ cm$^3$ (STP)/g of the hard carbon provided in the present application satisfies $20 \leq V_1 \leq 150$. The higher the $V_1$ is, the more the active ion storage sites are provided by the hard carbon, and the higher the capacity of the hard carbon is. In some embodiments, optionally, $30 \leq V_1 \leq 150$, $40 \leq V_1 \leq 150$, $50 \leq V_1 \leq 150$, $60 \leq V_1 \leq 150$, $70 \leq V_1 \leq 150$, $80 \leq V_1 \leq 150$, $90 \leq V_1 \leq 150$, $110 \leq V_1 \leq 150$, $120 \leq V_1 \leq 150$, $30 \leq V_1 \leq 140$, $40 \leq V_1 \leq 140$, $50 \leq V_1 \leq 140$, $60 \leq V_1 \leq 140$, $70 \leq V_1 \leq 140$, $80 \leq V_1 \leq 140$, $90 \leq V_1 \leq 140$, $100 \leq V_1 \leq 140$, $110 \leq V_1 \leq 140$, $120 \leq V_1 \leq 140$, $30 \leq V_1 \leq 130$, $40 \leq V_1 \leq 130$, $50 \leq V_1 \leq 130$, $60 \leq V_1 \leq 130$, $70 \leq V_1 \leq 130$, $80 \leq V_1 \leq 130$, $90 \leq V_1 \leq 130$, $100 \leq V_1 \leq 130$, $110 \leq V_1 \leq 130$, $30 \leq V_1 \leq 120$, $40 \leq V_1 \leq 120$, $50 \leq V_1 \leq 120$, $60 \leq V_1 \leq 120$, $70 \leq V_1 \leq 120$, $80 \leq V_1 \leq 120$, $90 \leq V_1 \leq 120$, $100 \leq V_1 \leq 120$, or $110 \leq V_1 \leq 120$. When $V_1$ is within an appropriate range, the hard carbon provided in the present application can have both higher capacity and higher first coulomb efficiency.

The total quantity of adsorbed nitrogen $V_1$ cm$^3$ (STP)/g under the relative pressure $P/P_0$ of nitrogen between $10^{-8}$ and 0.035 and the total quantity of adsorbed nitrogen $V_2$ cm$^3$ (STP)/g under the relative pressure $P/P_0$ of nitrogen between 0.035 and 1 of the hard carbon provided in the present application satisfy: $V_2/V_1 \leq 0.20$. Within this range, the hard carbon may have an appropriate pore channel structure, can provide many active ion storage sites, and achieves a high utilization of the active ion storage sites. Further, the pore channel structure inside the hard carbon mainly comprises a micropore structure with a moderate content of mesopore or macropore structure, thereby reducing the electrolyte solution infiltrated region inside the hard carbon. In some embodiments, $V_2/V_1$ may be $\leq 0.19$, $\leq 0.18$, $\leq 0.17$, $\leq 0.16$, $\leq 0.15$, $\leq 0.14$, $\leq 0.13$, $\leq 0.12$, $\leq 0.11$, or $\leq 0.10$. Further, $V_2/V_1$ should not be very low. In this case, the active ions stored at the active ion storage sites can hardly be deintercalated. In some embodiments, optionally, $0.05 \leq V_2/V_1 \leq 0.20$, $2/V_1 \leq 0.20$, $0.08 \leq V_2/V_1 \leq 0.20$, $0.10 \leq V_2/V_1 \leq 0.20$, $0.12 \leq V_2/V_1 \leq 0.20$, $0.14 \leq V_2/V_1 \leq 0.20$, $0.05 \leq V_2/V_1 \leq 0.18$, $0.06 \leq V_2/V_1 \leq 0.18$, $0.08 \leq V_2/V_1 \leq 0.18$, $0.10 \leq V_2/V_1 \leq 0.18$, $0.12 \leq V_2/V_1 \leq 0.18$, $0.14 \leq V_2/V_1 \leq 0.18$, $0.16 \leq V_2/V_1 \leq 0.18$, $0.05 \leq V_2/V_1 \leq 0.16$, $0.06 \leq V_2/V_1 \leq 0.16$, $0.08 \leq V_2/V_1 \leq 0.16$, $0.10 \leq V_2/V_1 \leq 0.16$, $0.12 \leq V_2/V_1 \leq 0.16$, or $0.14 \leq V_2/V_1 \leq 0.16$. When $V_2/V_1$ is within an appropriate range, the hard carbon can have both higher capacity and higher first coulomb efficiency.

In some embodiments, $0 < V_2 \leq 30$. The higher the $V_2$ is, the higher the proportion of the electrolyte solution infiltrated region inside the hard carbon is, and the higher the first irreversible capacity loss of the hard carbon is. Further, $V_2$ should not be very low. When $V_2$ is low, the active ions can hardly be quickly intercalated and deintercalated, and the rate performance of the hard carbon may become worsened. Optionally, $1 \leq V_2 \leq 30$, $2 \leq V_2 \leq 30$, $3 \leq V_2 \leq 30$, $4 \leq V_2 \leq 30$, $5 \leq V_2 \leq 30$, $6 \leq V_2 \leq 30$, $7 \leq V_2 \leq 30$, $8 \leq V_2 \leq 30$, $9 \leq V_2 \leq 30$, $10 \leq V_2 \leq 30$, $1 \leq V_2 \leq 25$, $2 \leq V_2 \leq 25$, $3 \leq V_2 \leq 25$, $4 \leq V_2 \leq 25$, $2 \leq 25$, $6 \leq V_2 \leq 25$, $7 \leq V_2 \leq 25$, $8 \leq V_2 \leq 25$, $9 \leq V_2 \leq 25$, $10 \leq V_2 \leq 25$, $1 \leq V_2 \leq 20$, $2 \leq V_2 \leq 20$, $3 \leq V_2 \leq 20$, $4 \leq V_2 \leq 20$, $5 \leq V_2 \leq 20$, $6 \leq V_2 \leq 20$, $7 \leq V_2 \leq 20$, $8 \leq V_2 \leq 20$, $9 \leq V_2 \leq 20$, or $10 \leq V_2 \leq 20$. When $V_2$ is within an appropriate range, the hard carbon not only can have higher capacity and higher first coulomb efficiency, but also can have outstanding rate performance.

In some embodiments, the hard carbon satisfies: $0.08 \leq V_2/V_1 \leq 0.20$, $70 \leq V_1 \leq 150$, and $6 \leq V_2 \leq 30$. In this case, the hard carbon can provide many active ion storage sites, making it have higher capacity. Further, the hard carbon has an appropriate pore channel structure inside the hard carbon, thus facilitating the intercalation and storage of the active ions without hindering the deintercalation of the active ions, thereby resulting in a high utilization of the active ion storage sites. Further, the pore channel structure inside the hard carbon mainly comprises a micropore structure with a moderate content of mesopore or macropore structure, thereby further reducing the electrolyte solution infiltrated region inside the hard carbon. Therefore, the hard carbon not only can have both higher capacity and higher first coulomb efficiency, but also can have outstanding rate performance. Further, the hard carbon satisfies: $0.08 \leq V_2/V_1 \leq 0.20$, $85 \leq V_1 \leq 140$, and $7 \leq V_2 \leq 25$.

Figure 11:
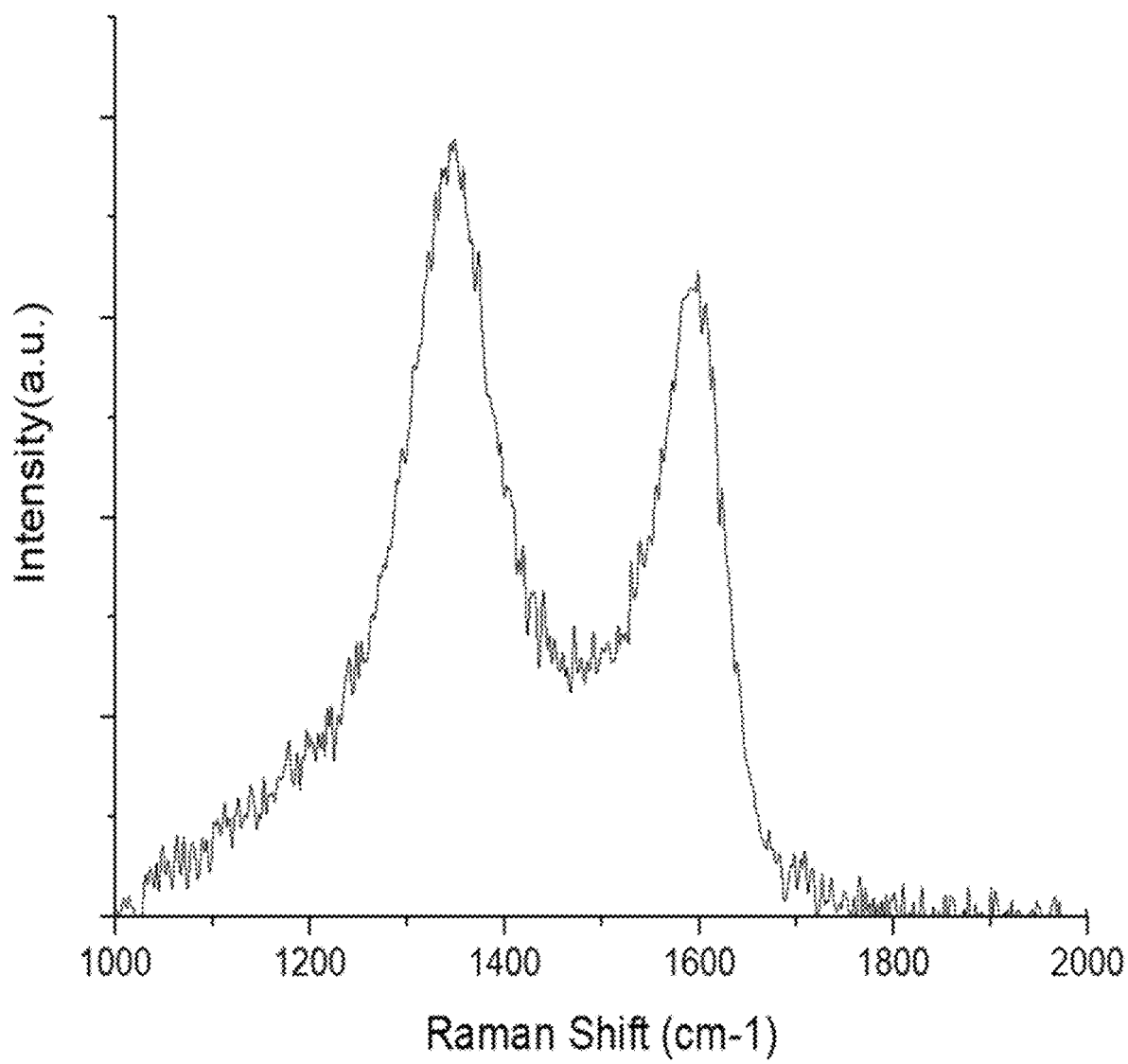
FIG. 11 shows a Raman spectrum of a hard carbon prepared according to Embodiment 5.

In some embodiments, in a Raman spectrum of the hard carbon, $I_d/I_g$ is from 1.20 to 1.32, where $I_d$ represents d peak intensity of a Raman shift in a range of $1{,}350 \pm 50$ cm$^{-1}$, and $I_g$ represents g peak intensity of the Raman shift in a range of $1{,}580 \pm 50$ cm$^{-1}$, where a laser wavelength $\lambda$ is 532 nm. For example, FIG. 11 shows a Raman spectrum of a hard carbon prepared according to Embodiment 5 described below.

The d peak is caused by a lattice defect of carbon atoms, and the g peak is caused by in-plane vibration of sp2 carbon atoms. In the hard carbon structure, the d peak intensity is associated with the number of defects in the hard carbon structure, and the g peak intensity is associated with the number of graphite microcrystals in the hard carbon structure. Therefore, $I_d/I_g$ may represent a degree of order of the hard carbon structure. The smaller the $I_d/I_g$ is, the higher the degree of order of the hard carbon structure is, and the higher the integrity of the carbon plane is. The first coulomb efficiency of the hard carbon is increased, but its capacity becomes lowered, and its rate performance becomes worsened. The $I_d/I_g$ of the hard carbon in the present application is from 1.20 to 1.32. In this case, the hard carbon structure has a moderate degree of order, such that the hard carbon not only has higher capacity and higher first coulomb efficiency, but also has outstanding rate performance.

Figure 12:
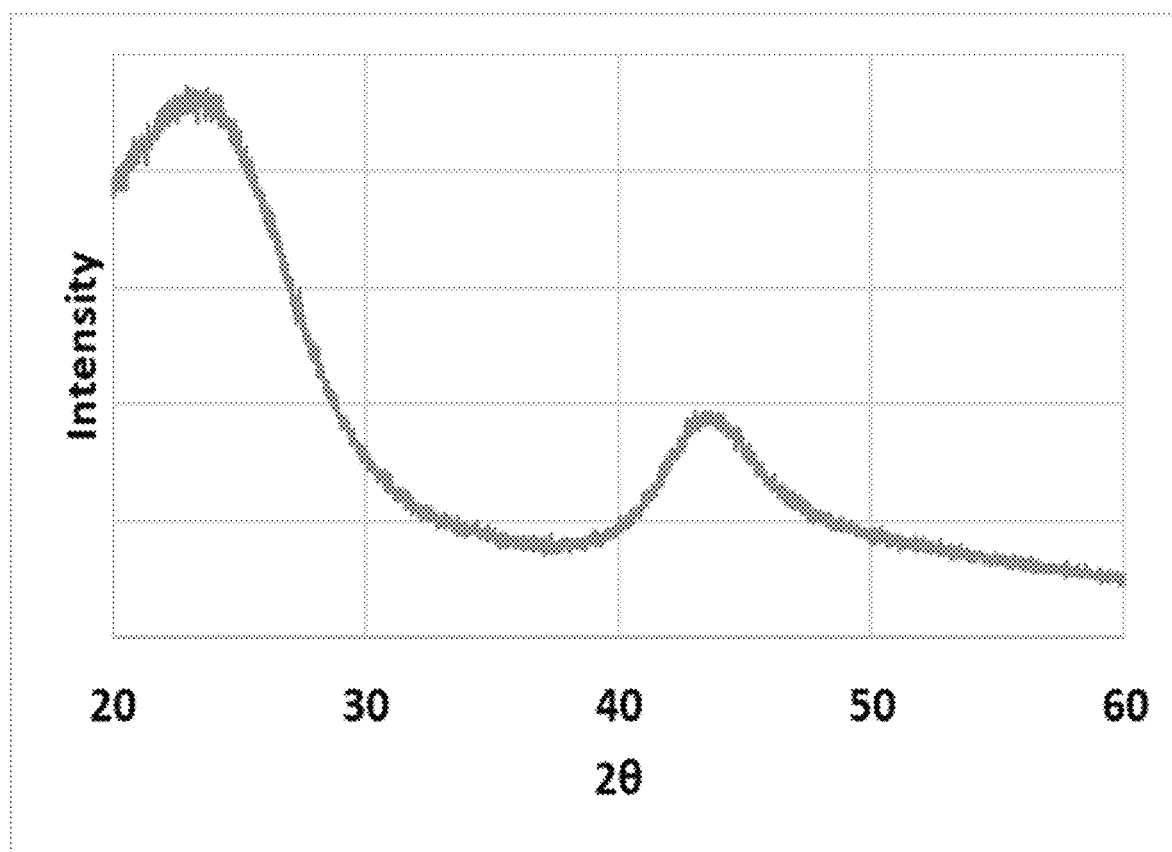
FIG. 12 shows an X-ray diffraction (XRD) pattern of a hard carbon prepared according to Embodiment 5.

In some embodiments, in an X-ray diffraction pattern of the hard carbon, a $2\theta$ value corresponding to peak 002 is between 22° and 24°. For example, FIG. 12 shows the X-ray diffraction of a hard carbon prepared according to Embodiment 5 described below.

In some embodiments, a volumetric particle size Dv50 of the hard carbon is from 2 μm to 15 μm; and is optionally from 4 μm to 8 μm.

In some embodiments, a volumetric particle size Dv90 of the hard carbon is from 5 μm to 25 μm; and is optionally from 8 μm to 15 μm.

In some embodiments, the volumetric particle size Dv50 of the hard carbon is from 4 μm to 8 μm, and the volumetric particle size Dv90 of the hard carbon is from 8 μm to 15 μm.

The volumetric particle size Dv50 and/or Dv90 of the hard carbon within an appropriate range contributes to improving the transport performance of active ions and electrons, thereby further improving the rate performance of the secondary battery.

In some embodiments, a specific surface area of the hard carbon is less than or equal to 5 m$^2$/g. Optionally, the specific surface area of the hard carbon may be 0.1 m²/g-5 m²/g, 0.5 m²/g-5 m²/g, 1 m²/g-5 m²/g, 1.5 m²/g-5 m²/g, 2 m²/g-5 m²/g, 2.5 m²/g-5 m²/g, 3 m²/g-5 m²/g, 3.5 m²/g-5 m²/g, 4 m²/g-5 m²/g, 0.5 m²/g-4 m²/g, 1 m²/g-4 m²/g, 1.5 m²/g-4 m²/g, 2 m²/g-4 m²/g, 2.5 m²/g-4 m²/g, 3 m²/g-4 m²/g, 0.5 m²/g-3 m²/g, 1 m²/g-3 m²/g, 1.5 m²/g-3 m²/g, or 2 m²/g-3 m²/g. A lower specific surface area contributes to reducing the surface activity of the hard carbon, and reducing the formation of a solid electrolyte interphase (SEI) film, thus improving the first coulomb efficiency of the hard carbon and the secondary battery; while a higher specific surface area contributes to accelerating the transport of active ions, thus improving the rate performance of the secondary battery. When the specific surface area of the hard carbon is within an appropriate range, the hard carbon not only can have both higher capacity and first coulomb efficiency, but also can have better rate performance. In addition, when the specific surface area of the hard carbon is within the appropriate range, the hard carbon can further have a strong bonding force to a binder, thereby improving the cohesion and bonding force of a negative electrode sheet, reducing the volume expansion of the negative electrode sheet in the cycle process, and making the secondary battery have better cycling performance.

In some embodiments, a powder compaction density of the hard carbon under a force of N is from 0.96 g/cm³ to 1.05 g/cm³. When the powder compaction density of the hard carbon is within an appropriate range, the compaction density of the negative electrode sheet can be improved, thereby improving the energy density of the secondary battery.

In some embodiments, a tap density of the hard carbon is from 0.80 g/cm³ to 0.95 g/cm³. When the tap density of the hard carbon is within an appropriate range, the compaction density of the negative electrode sheet can be improved, thereby improving the energy density of the secondary battery.

In the present application, nitrogen adsorption test of the hard carbon at a temperature of 77K may be carried out with reference to GB/T 21650.2-2008 Pore size distribution and porosity of solid materials by mercury porosimetry and gas adsorption—Part 2: Analysis of mesopores and macropores by gas adsorption. For exmaple, the nitrogen adsorption may be determined using a surface area and pore size analyzer, e.g., ASAP 2460 surface area and pore size analyzer of Micrometrics Instruments Corporation.

In the present application, the volumetric particle sizes Dv50 and Dv90 of the hard carbon have well-known meanings in the art, represent the corresponding particle sizes when the cumulative volume distribution percentage of the material reaches 50% and 90% respectively, and may be determined using known instruments and methods in the art, for example, may be conveniently determined using a laser particle size analyzer, such as Mastersizer 2000E laser particle size analyzer of Malvern Instruments Ltd, by referring to GB/T 19077-2016 Particle size analysis-laser diffraction methods.

In the present application, the specific surface area of the hard carbon has a well-known meaning in the art, and may be determined using known instruments and methods in the art, for example, may be tested using the specific surface area analysis and test method by nitrogen adsorption with reference to GB/T 19587-2017, and computed using the BET (BrunauerEmmett Teller) method, where the specific surface area analysis and test method by nitrogen adsorption may be carried out using ASAP 3020 surface area and pore size analyzer of Micrometrics Instruments Corporation.

In the present application, the powder compaction density of the hard carbon has a well-known meaning in the art, and may be determined using known instruments and methods in the art, for example, may be determined using an electronic pressure testing machine (e.g., UTM7305) by referring to the standard GB/T24533-2009. An example test method is as follows: 1 g of hard carbon powder is weighed, added into a mold with a base area of 1.327 cm², pressurized to 5,000 kg (equivalent to 50,000 N), kept under this pressure for 30 s, then depressurized, and kept under this pressure for 10 s. Then, the powder compaction density of the hard carbon under the force of 50,000 N is recorded and computed.

In the present application, the tap density of the hard carbon has a well-known meaning in the art, and may be determined using known instruments and methods in the art, for example, may be determined using a powder tap density tester (e.g., BT-301 of Dandong Better) by referring to GB/T 5162-2006.

Method for Preparing Hard Carbon

The second aspect of the embodiments of the present application provides a method for preparing a hard carbon, including the following steps: S10: providing a carbon source; S20: heat treating the carbon source in an inert atmosphere at a first temperature T1 for a duration of t1 to obtain a first intermediate product; S30: heat treating the resulting first intermediate product in an air atmosphere at a second temperature T2 for a duration of t2 to obtain a second intermediate product; and S40: carbonizing the resulting second intermediate product in an inert atmosphere at a third temperature T3 for a duration of t3 to obtain the hard carbon. A total quantity of adsorbed nitrogen under a relative pressure $P/P_0$ of nitrogen between $10^{-8}$ and 0.035 is $V_1$ cm³ (STP)/g and a total quantity of adsorbed nitrogen under a relative pressure $P/P_0$ of nitrogen between 0.035 and 1 is $V_2$ cm³ (STP)/g in a nitrogen adsorption isotherm determined at a temperature of 77 K for the hard carbon, and the hard carbon satisfies: $V_2/V_1 \leq 0.20$ and $20 \leq V_1 \leq 150$, where P represents an actual pressure of nitrogen, and $P_0$ represents a saturated vapor pressure of nitrogen at a temperature of 77 K.

The preparation method in the second aspect of the embodiments of the present application is capable of preparing the hard carbon in any one embodiment in the first aspect of the embodiments of the present application.

In some embodiments, T1<T3, T2<T3$_o$

In some embodiments, T1≤T2. Optionally, T1<T2.

The inventor was surprised to find that the hard carbon obtained through a low-temperature heat treatment process in an inert atmosphere, two low-temperature heat treatment processes in an air atmosphere, and a high-temperature carbonization process in an inert atmosphere of the carbon source is capable of having both high capacity and high first coulomb efficiency. Compared with the existing commercialized hard carbon, the hard carbon obtained in accordance with the preparation method in the present application has obviously improved capacity and first coulomb efficiency.

The method for preparing a hard carbon provided in the present application is simple and adapted to commercial production.

The method for preparing a hard carbon provided in the present application neither needs to additionally add a conductive agent, nor needs to additionally add other adjuvants, so that the hard carbon obtained in accordance with the preparation method provided in the present application has a lower content of heteroatoms, and is capable of further reducing irreversible consumption of the heteroatoms on active ions.

In the method for preparing a hard carbon provided in the present application, heat treatment of the carbon source in an inert atmosphere at a low first temperature is capable of better stabilizing the framework structure of the carbon source, and providing a stable carbon skeleton structure for subsequent two low-temperature heat treatments and a pore forming process in high-temperature carbonization; two low-temperature heat treatments of the first intermediate product in an air atmosphere at a low second temperature can form an appropriate pore channel structure in the carbon skeleton structure, and provide convenience for two pore forming processes in the subsequent high-temperature carbonization; and the high-temperature carbonization of the second intermediate product in an inert atmosphere at a high third temperature can improve the degree of order of the resulting hard carbon.

Types of the inert atmosphere are not particularly limited. In some embodiments, the inert atmosphere is one or more selected from a nitrogen atmosphere and an argon atmosphere.

In some embodiments, the first temperature $T1 \leq 300°$ C. A high first temperature T1 tends to cause decomposition of a large amount of skeleton structure that is formed after heat treatment of the carbon source and is adapted to conversion into an appropriate pore channel structure, and then causes lack of an appropriate skeleton structure in the subsequent heat treatment process for forming the pore channel structure, showing on the nitrogen adsorption isotherm determined at a temperature of 77 K for the hard carbon that $V_1$ and $V_2$ are both small, and the hard carbon has a low capacity. Further, the first temperature T1 should not be very low. When the first temperature T1 is low, the cross-linking degree of the carbon source after heat treatment is low, and the formed skeleton structure is fragile with low stability. When the pore channel structure is introduced by low-temperature heat treatment in an air atmosphere, the fragile skeleton structure may be easily collapsed, thus resulting in the reduction of the pore channel structure of the hard carbon, showing on the nitrogen adsorption isotherm determined at a temperature of 77 K for the hard carbon that $V_1$ is small. Further, the collapse of the skeleton structure will cause pore merging, thus increasing the number and proportion of large-sized pores, and further decreasing the capacity and the first coulomb efficiency of the hard carbon.

In some embodiments, the first temperature T1 may be 180° C.-300° C., 200° C.-300° C., 220° C.-300° C., 240° C.-300° C., 260° C.-300° C., 280° C.-300° C., 180° C.-280° C., 200° C.-280° C., 220° C.-280° C., 240° C.-280° C., 260° C.-280° C., 180° C.-260° C., 200° C.-260° C., 220° C.-260° C., 240° C.-260° C., 180° C.-240° C., 200° C.-240° C., 220° C.-240° C., or 180° C.-220° C. When the first temperature T1 is within an appropriate range, many skeleton structures that are adapted to introducing an appropriate pore channel structure, are stable, and are uncollapsable can be retained.

In some embodiments, the heat treatment time t1 is from 4 h to 60 h. Those skilled in the art may select appropriate heat treatment time within the above range based on the employed first temperature. For example, when the first temperature is high, the heat treatment time may be appropriately shortened. Based on different types of carbon sources, the heat treatment time is slightly different, and may be adjusted by those skilled in the art based on actual requirements.

In some embodiments, the second temperature $T2<400°$ C. When the second temperature T2 is very high, the reaction rate between the carbon skeleton material obtained in S20 and air is fast, and the air does not have enough time to diffuse into the material particles, such that the pore channel structure formed in the pore forming process tends to be concentrated on particle surface regions. In addition, after excessive pores are formed in the particle surface regions, the pore channel structure may be easily collapsed to cause pore merging, thus resulting in a high number and proportion of large-sized pores, and then reducing both the capacity and the first coulomb efficiency of hard carbon. Further, the second temperature T2 should not be very low. When the second temperature T2 is low, the reaction rate between the carbon skeleton material obtained in S20 and air is low with weak pore forming effect, thus resulting in a low capacity of the hard carbon.

In some embodiments, the second temperature T2 may be 200° C.-395° C., 220° C.-395° C., 240° C.-395° C., 260° C.-395° C., 280° C.-395° C., 300° C.-395° C., 320° C.-395° C., 340° C.-395° C., 360° C.-395° C., 200° C.-380° C., 220° C.-380° C., 240° C.-380° C., 260° C.-380° C., 270° C.-350° C., 270° C.-380° C., 280° C.-380° C., 300° C.-380° C., 320° C.-380° C., 340° C.-380° C., 360° C.-380° C., 290° C.-380° C., 290° C.-350° C., 200° C.-360° C., 220° C.-360° C., 240° C.-360° C., 260° C.-360° C., 280° C.-360° C., 300° C.-360° C., 320° C.-360° C., 200° C.-340° C., 220° C.-340° C., 240° C.-340° C., 260° C.-340° C., 280° C.-340° C., 300° C.-340° C., 200° C.-320° C., 220° C.-320° C., 240° C.-320° C., 260° C.-320° C., 280° C.-320° C., 200° C.-300° C., 220° C.-300° C., 240° C.-300° C., 260° C.-300° C., 200° C.-280° C., 220° C.-280° C., 240° C.-280° C., 200° C.-260° C., 220° C.-260° C., or 200° C.-240° C. When the second temperature T2 is within an appropriate range, appropriate and abundant pore channel structures can be formed from inside to outside of the carbon skeleton material particles obtained in S20, and the transport performance of active ions and electrons can be improved, thus further improving the capacity and the first coulomb efficiency of the hard carbon.

In some embodiments, the heat treatment time t2 is from 1 h to 12 h. Those skilled in the art may select appropriate heat treatment time within the above range based on the employed second temperature. For example, when the second temperature is high, the heat treatment time may be appropriately shortened. Based on different types of carbon sources, the heat treatment time is slightly different, and may be adjusted by those skilled in the art based on actual requirements.

In some embodiments, optionally, when $T2 \leq 270°$ C., $t2 \geq 10$ h; and further, when $200° C. \leq T2 \leq 270°$ C., $10 h \leq t2 \leq 12$ h.

In some embodiments, optionally, when $270°$ C.$<T2<400°$ C., $t2 \leq 8$ h; and further, when $270°$ C.$<T2<400°$ C., $1 h \leq t2 \leq 8$ h.

In some embodiments, $270°$ C.$\leq T2 \leq 380°$ C., and $1 h \leq t2 \leq 4$ h. When both are within the given ranges, the capacity and the first coulomb efficiency of the hard carbon can be further improved.

In some embodiments, the third temperature T3 is from 1,000° C. to 1,600° C. When the third temperature T3 is low, a large number of extremely tiny pore structures in the structure of the second intermediate product obtained in S30 are retained. However, these extremely tiny pore structures have low strength, and may be very easily destroyed in later charge-discharge process, thus decreasing of the utilization of the active ion storage sites, and then reducing both the capacity and the first coulomb efficiency of the hard carbon. Further, the third temperature T3 should not be very high. When the third temperature T3 is high, micromotion of the graphite microcrystalline structure formed in the carbonization process tends to occur, such that the formed pore channel structure is forced to be adjusted, thereby significantly reducing the pore channel structure, and decreasing the capacity of the hard carbon.

In some embodiments, the third temperature T3 may be 1,100° C.-1,600° C., 1,200° C.-1,600° C., 1,300° C.-1,600° C., 1,400° C.-1,600° C., 1,500° C.-1,600° C., 1,000° C.-1,500° C., 1,100° C.-1,500° C., 1,200° C.-1,500° C., 1,300° C.-1,500° C., 1,400° C.-1,500° C., 1,000° C.-1,400° C., 1,100° C.-1,400° C., 1,200° C.-1,400° C., 1,300° C.-1,400° C., 1,000° C.-1,300° C., 1,000° C.-1,350° C., 1,100° C.-1,300° C., 1,200° C.-1,300° C., 1,000° C.-1,200° C., 1,100° C.-1,200° C., or 1,000° C.-1,100° C. When the third temperature T3 is within an appropriate range, the degree of order of the hard carbon can be better improved, such that the hard carbon has both high capacity and high first coulomb efficiency.

In some embodiments, the heat treatment time t3 is from 1 h to 12 h. Those skilled in the art may select appropriate heat treatment time within the above range based on the employed third temperature. For example, when the third temperature is high, the heat treatment time may be appropriately shortened. Based on different types of carbon sources, the heat treatment time is slightly different, and may be adjusted by those skilled in the art based on actual requirements.

In some embodiments, the heating rate in S20 may be from 1° C./min to 10° C./min. However, in the present application, the heating rate is not limited to this, and may be adjusted based on actual requirements. For example, the heating rate is 1° C./min-9° C./min, 1° C./min-8° C./min, 1° C./min-7° C./min, 1° C./min-6° C./min, 1° C./min-5° C./min, 1° C./min-4° C./min, 1° C./min-3° C./min, 1° C./min-2° C./min, 2° C./min-10° C./min, 3° C./min-9° C./min, 4° C./min-8° C./min, or ° C./min-7° C./min.

In some embodiments, the heating rate in S30 may be from 1° C./min to 5° C./min. However, in the present application, the heating rate is not limited to this, and may be adjusted based on actual requirements. For example, the heating rate is 1° C./min-4° C./min, 1° C./min-3° C./min, 1° C./min-2° C./min, 2° C./min-5° C./min, 2° C./min-4° C./min, 2° C./min-3° C./min, 3° C./min-5° C./min, 3° C./min-4° C./min, or 4° C./min-5° C./min.

In some embodiments, the heating rate in S40 is from 1° C./min to 10° C./min. However, in the present application, the heating rate is not limited to this, and may be adjusted based on actual requirements. For example, the heating rate is 1° C./min-9° C./min, 1° C./min-8° C./min, 1° C./min-7° C./min, 1° C./min-6° C./min, 1° C./min-5° C./min, 1° C./min-4° C./min, 1° C./min-3° C./min, 1° C./min-2° C./min, 2° C./min-10° C./min, 3° C./min-9° C./min, 4° C./min-8° C./min, or 5° C./min-7° C./min.

In some embodiments, after S20 and prior to S30, the preparation method further includes: S21: crushing the first intermediate product obtained in S20, e.g., to mm level, such that agglomerated first intermediate product may be crushed, to guarantee full contact between the first intermediate product and air in subsequent treatment. Of course, in some embodiments, this step may be omitted.

In some embodiments, after S30 and prior to S40, the preparation method further includes: S31: crushing the second intermediate product obtained in S30. For example, in some embodiments, a volumetric particle size Dv50 of the crushed second intermediate product is from 2 μm to 15 μm, and is optionally from 4 μm to 8 μm. In some embodiments, a volumetric particle size Dv90 of the crushed second intermediate product is from 5 μm to 25 μm; and is optionally from 8 μm to 15 μm. In some embodiments, the volumetric particle size Dv50 of the crushed second intermediate product is from 4 μm to 8 μm, and the volumetric particle size Dv90 of the crushed second intermediate product is from 8 μm to 15 μm. Of course, in some embodiments, this step may be omitted.

In some embodiments, the preparation method further includes: S50: crushing the hard carbon obtained in S40. In this case, the agglomerated hard carbon may be crushed to satisfy a required particle size, and facilitate preparing a negative electrode slurry and a negative electrode sheet. Of course, in some embodiments, this step may be omitted.

In the present application, types of the carbon source are not particularly limited. In some embodiments, the carbon source includes one or more of a polymer, a resin, and a biomass material.

As an example, the polymer includes one or more of polyaniline and polypyrrole.

As an example, the resin includes one or more of a phenolic resin and an epoxy resin. Optionally, the phenolic resin includes one or more of a phenol-formaldehyde resin, a resorcinol-formaldehyde resin, a p-diphenol-formaldehyde resin, and a phenol-furfural resin.

As an example, the biomass material includes one or more of starch, glucose, fructose, maltose, sucrose, cellulose, hemicellulose, and lignin. Optionally, the starch includes one or more of cereal starch, tuber starch, and bean starch. Examples of the cereal starch may include, but are not limited to, one or more of corn starch, rice starch, millet starch, sorghum starch, wheat starch, oat starch, buckwheat starch, and rye starch. Examples of the tuber starch may include, but are not limited to, one or more of cassava starch, potato starch, sweet potato starch, yam starch, and taro starch. Examples of the bean starch may include, but are not limited to, one or more of mung bean starch, broad bean starch, pea starch, and cowpea starch.

Optionally, the carbon source is selected from the biomass material. Further, the carbon source is one or more selected from starch, glucose, fructose, maltose, sucrose, cellulose, hemicellulose, and lignin. The above biomass material is cheap with a few kinds of heteroatoms (atoms except for O and H) and a high content of carbon element, and is capable of avoiding the influence of heteroatoms on the process for preparing a hard carbon. Further, the above biomass material is cross-linkable even at a low temperature, thereby contributing to the formation of a more stable skeleton structure, and then obtaining a hard carbon with an appropriate pore channel structure.

In the present application, the biomass material may be directly purchased, or may be extracted from a plant.

In some embodiments, the method for preparing a hard carbon includes the following steps: providing a carbon source, where the carbon source is a biomass material, and is optionally a starch; heat treating the carbon source in an inert atmosphere at a temperature less than or equal to 300° C. for 4 h-60 h, to obtain a first intermediate product; heat treating the resulting first intermediate product in an air atmosphere at a temperature less than 400° C. for 1 h-12 h, to obtain a second intermediate product; and carbonizing the resulting second intermediate product in an inert atmosphere at a temperature from 1,000° C. to 1,600° C. for 1 h-12 h to obtain the hard carbon.

In some embodiments, the method for preparing a hard carbon includes the following steps: providing a carbon source, where the carbon source is a biomass material, and is optionally a starch; heat treating the carbon source in an inert atmosphere at a temperature less than or equal to 300° C. for 4 h-60 h, to obtain a first intermediate product; heat treating the resulting first intermediate product in an air atmosphere at a temperature less than 400° C. for 1 h-12 h, to obtain a second intermediate product; and crushing the resulting second intermediate product until a volumetric particle size Dv50 is from 2 μm to 15 μm and/or Dv90 from 5 μm to 25 μm, and then carbonizing the crushed second intermediate product in an inert atmosphere at a temperature from 1,000° C. to 1,600° C. for 1 h-12 h to obtain the hard carbon.

Secondary Battery

The third aspect of the embodiments of the present application provides a secondary battery. In the present application, types of the secondary battery are not particularly limited. For example, the secondary battery may be, a lithium-ion battery, a sodium-ion battery and the like. In particular, the secondary battery is a sodium-ion secondary battery. In general, the secondary battery comprises a positive electrode sheet, a negative electrode sheet, an electrolyte, and the like. During charge-discharge of the secondary battery, active ions are intercalated and deintercalated back and forth between the positive electrode sheet and the negative electrode sheet, and the electrolyte serves for conducting the active ions between the positive electrode sheet and the negative electrode sheet.

[Negative Electrode Sheet]

In some embodiments, the negative electrode sheet comprises a negative electrode current collector and a negative electrode film layer arranged on at least one surface of the negative electrode current collector. For example, the negative electrode current collector has two surfaces opposite in its own thickness direction, and the negative electrode film layer is arranged on either one or both of the two opposite surfaces of the negative electrode current collector.

In some embodiments, the negative electrode film layer comprises at least one of the hard carbon according to any one embodiment in the first aspect of the embodiments of the present application or the hard carbon prepared in accordance with the method according to any one embodiment in the second aspect of the embodiments of the present application.

In some embodiments, the negative electrode film layer may further include other negative electrode active materials except for the hard carbon. In some embodiments, the other negative electrode active materials include, but are not limited to, at least one of natural graphite, artificial graphite, soft carbon, silicon-based material, tin-based material, and lithium titanate. The silicon-based material may include at least one of elementary silicon, silicon oxide, silicon-carbon composite, silicon-nitrogen composite, and silicon alloy material. The tin-based material may include at least one of elementary tin, tin oxide, and tin alloy material. In the present application, the negative electrode active material is not limited to these materials, and other conventional well-known materials usable for a negative electrode active material of a secondary battery may also be used.

In some embodiments, the negative electrode film layer further optionally comprises a negative electrode conductive agent. In the present application, types of the negative electrode conductive agent are not particularly limited. As an example, the negative electrode conductive agent may include at least one of superconducting carbon, conductive graphite, acetylene black, carbon black, Ketjen black, carbon dot, carbon nanotube, graphene, and carbon nanofiber. In some embodiments, based on a total mass of the negative electrode film layer, a percentage mass content of the negative electrode conductive agent is less than or equal to 5%.

In some embodiments, the negative electrode film layer further optionally comprises a negative electrode binder. In the present application, types of the negative electrode binder are not particularly limited. As an example, the negative electrode binder may comprise at least one of styrene butadiene rubber (SBR), water soluble unsaturated resin SR-1B, waterborne acrylic acid resin (e.g., polyacrylic acid (PAA), polymethacrylic acid (PMAA), and sodium polyacrylate (PAAS)), polyacrylamide (PAM), polyvinyl alcohol (PVA), sodium alginate (SA), and carboxymethyl chitosan (CMCS). In some embodiments, based on the total mass of the negative electrode film layer, a percentage mass content of the negative electrode binder is less than or equal to 5%.

In some embodiments, the negative electrode film layer further optionally comprises other adjuvants. As an example, the other adjuvants may include a thickener, e.g., sodium carboxymethyl cellulose (CMC Na), a PTC thermistor material and the like. In some embodiments, based on the total mass of the negative electrode film layer, a percentage mass content of the other adjuvants is less than or equal to 2%.

In some embodiments, a metal foil or a composite current collector may be used as the negative electrode current collector. As an example of the metal foil, a copper foil may be used. The composite current collector may comprise a high molecular material substrate layer and a metal material layer formed on at least one surface of the high molecular material substrate layer. As an example, the metal material may be at least one selected from copper, copper alloy, nickel, nickel alloy, titanium, titanium alloy, silver, and silver alloy. As an example, the high molecular material substrate layer may be selected from polypropylene (PP), polyethylene terephthalate (PET), polybutylene terephthalate (PBT), polystyrene (PS), polyethylene (PE), and the like.

The negative electrode film layer is generally formed by coating a negative electrode slurry on the negative electrode current collector, drying, and cold pressing. The negative electrode slurry is generally formed by dispersing the negative electrode active material, the optional conductive agent, the optional binder, and the other optional adjuvants in a solvent, and sufficiently stirring the mixture. The solvent may be, but is not limited to, N-methylpyrrolidone (NMP) or deionized water.

The negative electrode sheet does not exclude other additional functional layers except for the negative electrode film layer. For example, in some embodiments, the negative electrode sheet in the present application further includes a conductive priming coat (e.g., composed of a conductive agent and a binder) sandwiched between the negative electrode current collector and the negative electrode film layer and arranged on the surface of the negative electrode current collector. In some other embodiments, the negative electrode sheet according to the present application further comprises a protective layer covering the surface of the negative electrode film layer.

[Positive Electrode Sheet]

In some embodiments, the positive electrode sheet comprises a positive electrode current collector and a positive electrode film layer arranged on at least one surface of the positive electrode current collector. For example, the positive electrode current collector has two surfaces opposite in its own thickness direction, and the positive electrode film layer is arranged on either one or both of the two opposite surfaces of the positive electrode current collector.

A metal foil or a composite current collector may be used as the positive electrode current collector. As an example of the metal foil, an aluminum foil may be used. The composite current collector may comprise a high molecular material substrate layer and a metal material layer formed on at least one surface of the high molecular material substrate layer. As an example, the metal material may be one or more selected from aluminum, aluminum alloy, nickel, nickel alloy, titanium, titanium alloy, silver, and silver alloy. As an example, the high molecular material substrate layer may be selected from polypropylene (PP), polyethylene terephthalate (PET), polybutylene terephthalate (PBT), polystyrene (PS), polyethylene (PE) and the like.

The positive electrode film layer generally comprises a positive electrode active material, an optional binder, and an optional conductive agent. The positive electrode film layer is generally formed by coating a positive electrode slurry on the positive electrode current collector, drying, and cold pressing. The positive electrode slurry is generally formed by dispersing the positive electrode active material, the optional conductive agent, the optional binder, and any other component in a solvent, and sufficiently stirring the mixture. The solvent may be, but is not limited to, N-methylpyrrolidone (NMP). As an example, the binder used for the positive electrode film layer may comprise one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin. As an example, the conductive agent used for the positive electrode film layer includes one or more of superconducting carbon, conductive graphite, acetylene black, carbon black, Ketjen black, carbon dot, carbon nanotube, graphene, and carbon nanofiber.

A positive electrode active material for a secondary battery well-known in the art may be used as the positive electrode active material.

When the secondary battery in the present application is a lithium-ion battery, the positive electrode active material may comprise one or more of a lithium transition metal oxide, an olivine-structured lithium-containing phosphate, and their respective modified compounds. Examples of lithium transition metal oxides may include, but are not limited to, one or more of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt-manganese oxide, lithium-nickel-cobalt-aluminum oxide, and a modified compound thereof. Examples of olivine-structured lithium-containing phosphates may include, but are not limited to, one or more of lithium iron phosphate, lithium iron phosphate and carbon composite, lithium manganese phosphate, lithium manganese phosphate and carbon composite, lithium manganese iron phosphate, lithium manganese iron phosphate and carbon composite, and their respective modified compounds. In the present application, the positive electrode active material is not limited to these materials, and other conventional well-known materials usable for a positive electrode active material of a lithium-ion battery may also be used. These positive electrode active materials may be used alone or in combination of two or more.

In some embodiments, in order to further improve the energy density of the secondary battery, the positive electrode active material for a lithium-ion battery may comprise one or more of a lithium transition metal oxide shown in formula 1 and a modified compound thereof, $$Li_aNi_bCo_cM_dO_eA_f \quad \text{formula 1,}$$

in formula 1, $0.8 \leq a \leq 1.2$, $0.5 \leq b < 1$, $0 < c < 1$, $0 < d < 1$, $1 \leq e \leq 2$, $0 \leq f \leq 1$, M is one or more selected from Mn, Al, Zr, Zn, Cu, Cr, Mg, Fe, V, Ti, and B, and A is one or more selected from N, F, S, and Cl.

As an example, the positive electrode active material for a lithium-ion battery may include one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$, and $LiMnPO_4$.

When the secondary battery in the present application is a sodium-ion battery, particularly a sodium-ion secondary battery, the positive electrode active material may comprise one or more of a sodium transition metal oxide, a polyanion material (e.g., phosphate, fluorophosphate, pyrophosphate, sulphate and the like), and a Prussian blue material. In the present application, the positive electrode active material is not limited to these materials, and other conventional well-known materials usable for a positive electrode active material of a sodium-ion battery may also be used. These positive electrode active materials may be used alone or in combination of two or more.

As an example, the positive electrode active material for a sodium-ion battery may comprise one or more of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, a Prussian blue material, or a material having a general formula of $A_aM_b(PO_4)_cO_xY_{3-x}$ (where A is one or more selected from $H^+$, $Li^+$, $Na^+$, $K^+$, and $NH_4^+$; M is a transition metal cation, and is optionally one or more of V, Ti, Mn, Fe, Co, Ni, Cu, and Zn; Y is a halogen anion, and is optionally one or more of F, Cl, and Br; and $0 < a \leq 4$, $0 < b \leq 2$, $1 \leq c \leq 3$, and $0 \leq x \leq 2$).

In the present application, the modified compound of each of the above positive electrode active materials may be obtained by doping modification or surface coating modification of the positive electrode active material.

The positive electrode sheet in the present application does not exclude other additional functional layers except for the positive electrode film layer. For example, in some embodiments, the positive electrode sheet in the present application further includes a conductive priming coat (e.g., composed of a conductive agent and a binder) sandwiched between the positive electrode current collector and the positive electrode film layer and arranged on the surface of the positive electrode current collector. In some other embodiments, the positive electrode sheet in the present application further comprises a protective layer covering the surface of the positive electrode film layer.

[Electrolyte]

Types of the electrolyte in the present application are not particularly limited, and may be selected based on actual requirements. For example, the electrolyte may be at least one selected from a solid electrolyte and a liquid electrolyte (i.e., an electrolyte solution).

In some embodiments, the electrolyte solution is used as the electrolyte. The electrolyte solution comprises an electrolyte salt and a solvent.

Types of the electrolyte salt are not specifically limited, and may be selected based on actual requirements.

When the secondary battery in the present application is a lithium-ion secondary, as an example, the electrolyte salt may include at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalate)borate (LiBOB), lithium difluorophosphate (LiPO$_2$F$_2$), lithium difluorobis(oxalato)phosphate (LiDFOP), and lithium tetrafluoro(oxalato)phosphate (LiTFOP).

When the secondary battery in the present application is a sodium-ion battery, and particularly a sodium-ion secondary battery, the electrolyte salt may include one or more of sodium hexafluorophosphate (NaPF$_6$), sodium tetrafluoroborate (NaBF$_4$), sodium perchlorate (NaClO$_4$), sodium hexafluoroarsenate (NaAsF$_6$), sodium bis(fluorosulfonyl)imide (NaFSI), sodium bis(trifluoromethanesulfonyl)imide (NaTFSI), sodium trifluoromethanesulfonate (NaTFS), sodium difluoro(oxalato)borate (NaDFOB), sodium bis(oxalate)borate (NaBOB), sodium difluorophosphate (NaPO$_2$F$_2$), sodium difluorobis(oxalato)phosphate (NaDFOP), and sodium tetrafluoro(oxalato)phosphate (NaTFOP).

Types of the solvent are not specifically limited, and may be selected based on actual requirements. In some embodiments, as an example, the solvent may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS), and ethylsulfonylethane (ESE).

In some embodiments, the electrolyte solution further optionally comprises an additive. For example, the additive may include a negative electrode film-forming additive, or may include a positive electrode film-forming additive, or may further include an additive that is capable of improving some performance of the battery, such as an additive that improves overcharge performance of the battery, an additive that improves high temperature performance of the battery, an additive that improves low temperature power performance of the battery and the like.

[Separator]

The secondary battery using an electrolyte solution and some secondary batteries using a solid electrolyte further comprise a separator. The separator is arranged between the positive electrode sheet and the negative electrode sheet, to serve for separation. Types of the separator are not particularly limited in the present application, and may be any well-known separator with good chemical stability, good mechanical stability, and a porous structure.

In some embodiments, the material of the separator may be one or more selected from glass fiber, non-woven cloth, polyethylene, polypropylene, and polyvinylidene fluoride. The separator may be a single-layer film, or may be a multilayer composite film. When the separator is a multilayer composite film, the materials in each layer may be identical or different.

In some embodiments, the positive electrode sheet, the separator, and the negative electrode sheet may be made into an electrode assembly by a winding process or a lamination process.

In some embodiments, the secondary battery may comprise an outer package. The outer package may be used for encapsulating the above electrode assembly and electrolyte.

In some embodiments, the outer package of the secondary battery may be a hard case, such as a hard plastic case, an aluminum case, a steel case and the like. The outer package of the secondary battery may also be a soft package, such as a bag-type soft package. The material of the soft package may be one or more of plastic, e.g., one or more of polypropylene (PP), polybutylene terephthalate (PBT), polybutylene succinate (PBS) and the like.

Figure 2:
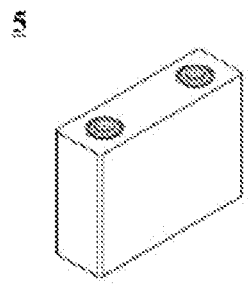
FIG. 2 is a schematic diagram of a secondary battery in an embodiment of the present application.

Shapes of the secondary battery are not particularly limited in the present application, and may be cylindrical, square, or any other shape. For example, FIG. 2 is a square-structured secondary battery 5 as an example.

Figure 3:
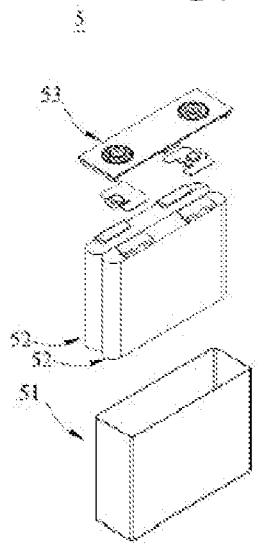
FIG. 3 is a schematic exploded view of the secondary battery in FIG. 2 in an embodiment.

In some embodiments, as shown in FIG. 3, the outer package may comprise a case 51 and a cover plate 53. The case 51 may comprise a bottom plate and a side plate connected to the bottom plate, which enclose to form an accommodating cavity. The case 51 has an opening that communicates with the accommodating cavity, and the cover plate 53 is used to cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution impregnates the electrode assembly 52. One or more electrode assemblies 52 may be comprised in the secondary battery 5, and the number of electrode assemblies comprised in the secondary battery may be selected as required.

The method for preparing a secondary battery in the present application is well-known. In some embodiments, the positive electrode sheet, the separator, the negative electrode sheet, and the electrolyte solution may be assembled to form a secondary battery. As an example, the positive electrode sheet, the separator, and the negative electrode sheet may be made into an electrode assembly by a winding process or a lamination process. The electrode assembly is placed in the outer package, dried, then injected with the electrolyte solution, and is subjected to the processes, such as vacuum encapsulation, standing, formation, and shaping, to obtain the secondary battery.

In some embodiments of the present application, the secondary battery according to the present application may be assembled into a battery module, a plurality of secondary batteries may be comprised in the battery module, and the specific number of the secondary batteries comprised in the battery module may be adjusted based on the application and capacity of the battery module.

Figure 4:
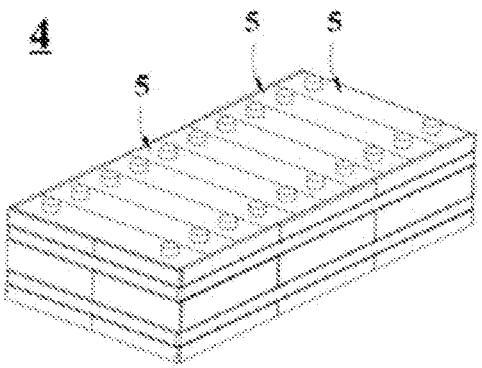
FIG. 4 is a schematic diagram of a battery module in an embodiment of the present application.

FIG. 4 is a schematic diagram of a battery module 4 as an example. As shown in FIG. 4, in the battery module 4, a plurality of secondary batteries 5 may be arranged successively along a length direction of the battery module 4, and of course, may also be arranged in any other manner. The plurality of secondary batteries 5 may further be fixed by fasteners.

Optionally, the battery module 4 can further include a shell having an accommodating space, in which the plurality of secondary batteries 5 are accommodated.

In some embodiments, the battery module may be further assembled into a battery pack, and the number of battery modules comprised in the battery pack may be adjusted based on the application and capacity of the battery pack.

Figure 5:
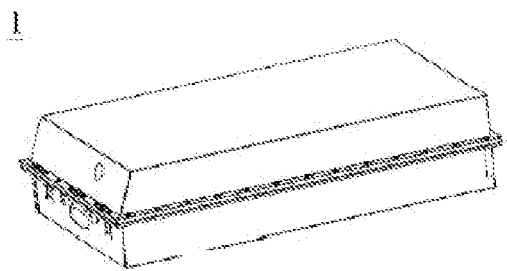
FIG. 5 is a schematic diagram of a battery pack in an embodiment of the present application.
Figure 6:
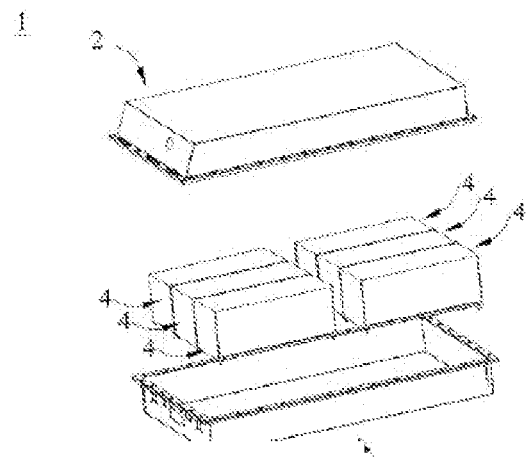
FIG. 6 is a schematic exploded view of the battery pack shown in FIG. 5 in an embodiment.

FIG. 5 and FIG. 6 are schematic diagrams of a battery pack 1 as an example. As shown in FIG. 5 and FIG. 6, the battery pack 1 may comprise a battery box and a plurality of battery modules 4 arranged in the battery box. The battery box comprises an upper box body 2 and a lower box body 3. The upper box body 2 is configured to cover the lower box body 3 and form an enclosed space for accommodating the battery module 4. The plurality of battery modules 4 may be arranged in the battery box in any manner.

[Electrical Apparatus]

An embodiment of the present application further provides an electrical apparatus. The electrical apparatus comprises at least one of the secondary battery, the battery module, or the battery pack in the present application. The secondary battery, the battery module, or the battery pack may be used as a power source of the electrical apparatus, or may be used as an energy storage unit of the electrical apparatus. The electrical apparatus may be, but is not limited to, a mobile device (such as a mobile phone, a laptop, and the like), an electric vehicle (such as an all-electric vehicle, a hybrid electric vehicle, a plug-in hybrid electric vehicle, an electric bicycle, an electric scooter, an electric golf cart, an electric truck, and the like), an electric train, a ship, a satellite, an energy storage system, etc.

The secondary battery, the battery module, or the battery pack may be selected for the electrical apparatus based on use demand thereof.

Figure 7:
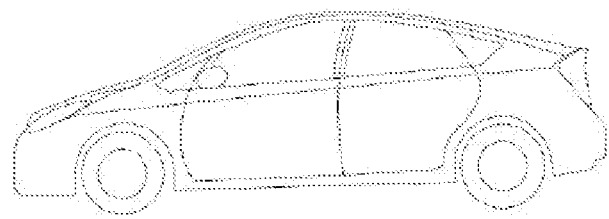
FIG. 7 is a schematic diagram of an electrical apparatus comprising the secondary battery in the present application as a power source in an embodiment.

FIG. 7 is a schematic diagram of an electrical apparatus as an example. The electrical apparatus is an all-electric vehicle, a hybrid electric vehicle, a plug-in hybrid electric vehicle and the like. In order to meet the requirements of the electrical apparatus for high power and high energy density, a battery pack or a battery module may be used.

As another example, the electrical apparatus may be a mobile phone, a tablet, a laptop, etc. The electrical apparatus is generally required to be light and thin, and can use a secondary battery as a power source.

EMBODIMENTS

The following embodiments describe the disclosure of the present application in more detail and are provided for illustrative purposes only, as various modifications and changes within the scope of the disclosure of the present application will be apparent to those skilled in the art. Unless otherwise stated, all parts, percentages, and ratios reported in the following embodiments are on a mass basis; all reagents used in the embodiments are commercially available or are synthesized in accordance with conventional methods, and may be directly used without further treatment; and the instruments used in the embodiments are commercially available.

Embodiment 1

A corn starch as a carbon source was placed in a tubular furnace, heated to 300° C. (a first temperature T1) in a nitrogen atmosphere at 5° C./min, and then kept at this temperature for heat treatment for 18 h (heat treatment time t1) to obtain a first intermediate product. The nitrogen atmosphere was changed to an air atmosphere. Then, the resulting first intermediate product was heated to 300° C. (a second temperature T2) at 3° C./min, and then kept at this temperature for heat treatment for 2 h (heat treatment time t2) to obtain a second intermediate product. The resulting second intermediate product was crushed, until a volumetric particle size Dv50 was from 4 μm to 8 μm and Dv90 was from 8 μm to 15 μm. Then, the crushed second intermediate product was heated to 1,100° C. (a third temperature T3) in a nitrogen atmosphere at 5° C./min, and then kept at this temperature for heat treatment for 12 h (heat treatment time t3) to obtain a hard carbon.

Embodiments 2-20

The method for preparing a hard carbon is similar to that in Embodiment 1, except that the preparation process parameters of the hard carbon are adjusted, details as per Table 1.

Comparative Embodiment 1

A corn starch as a carbon source was placed in a tubular furnace, heated to 240° C. in a nitrogen atmosphere at 3° C./min, and then kept at this temperature for heat treatment for 36 h to obtain a first intermediate product. The resulting first intermediate product was crushed, until a volumetric particle size Dv50 was from 4 μm to 8 μm and Dv90 was from 8 μm to 15 μm. Then, the crushed first intermediate product was heated to 1,200° C. in a nitrogen atmosphere at 5° C./min, and then kept at this temperature for heat treatment for 12 h to obtain a hard carbon.

Comparative Embodiment 2

A corn starch as a carbon source was placed in a tubular furnace, heated to 240° C. in an air atmosphere at 3° C./min, and then kept at this temperature for heat treatment for 36 h to obtain a first intermediate product. The resulting first intermediate product was crushed, until a volumetric particle size Dv50 was from 4 μm to 8 μm and Dv90 was from 8 μm to 15 μm. Then, the crushed first intermediate product was heated to 1,200° C. in a nitrogen atmosphere at 5° C./min, and then kept at this temperature for heat treatment for 12 h to obtain a hard carbon.

Comparative Embodiment 3

A corn starch as a carbon source was placed in a tubular furnace, heated to 300° C. in an air atmosphere at 3° C./min, and then kept at this temperature for heat treatment for 2 h to obtain a first intermediate product. The resulting first intermediate product was crushed, until a volumetric particle size Dv50 was from 4 μm to 8 μm and Dv90 was from 8 μm to 15 μm. Then, the crushed first intermediate product was heated to 1,200° C. in a nitrogen atmosphere at 5° C./min, and then kept at this temperature for heat treatment for 12 h to obtain a hard carbon.

Comparative Embodiments 4-6

The method for preparing a hard carbon is similar to that in Embodiment 1, except that the preparation process parameters of the hard carbon are adjusted, details as per Table 1.

The hard carbon prepared in each of the embodiments and comparative embodiments, a binder styrene butadiene rubber (SBR), a thickener sodium carboxymethyl cellulose (CMC-Na), and a conductive agent carbon black were sufficiently stirred and mixed at a mass ratio of 96.2:1.8:1.2:0.8 in an appropriate amount of solvent deionized water, to form a homogeneous negative electrode slurry. The negative electrode slurry was homogeneously coated on the surface of the negative electrode current collector copper foil, and dried in a drying oven for later use. Ethylene carbonate (EC), ethyl methyl carbonate (EMC), and diethyl carbonate (DEC) were mixed at a volume ratio of 1:1:1 to obtain an organic solvent, and then $NaPF_6$ was dissolved in the organic solvent to prepare an electrolyte solution at a concentration of 1 mol/L. Then, a CR2430 button battery was assembled in a glove box protected under argon with a metal sodium sheet as a counter electrode and with a polyethylene (PE) film as a separator.

At 25° C., first, the button battery prepared in each of the embodiments and comparative embodiments was discharged to 0 V at a constant current density of 10 mA/g, and the first-cycle discharge capacity of the button battery was denoted. Then, the button battery was charged to 2.0V at a constant current density of 10 mA/g, and the first-cycle charging capacity of the button battery was denoted.

Gram capacity of hard carbon (mAh/g)=first-cycle charging capacity of button battery/mass of hard carbon First coulomb efficiency of hard carbon (%)=first-cycle charging capacity of button battery/first-cycle discharge capacity of button battery×100%

The test results of Embodiments 1-20 and Comparative Embodiments 1-6 are shown in Table 2.

Figure 8:
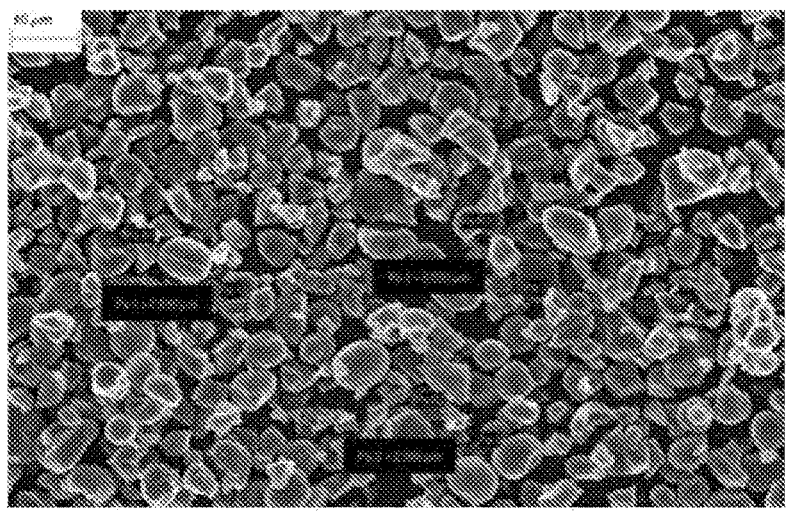
FIG. 8 is a scanning electron micrograph (SEM) of a hard carbon prepared in Embodiment 2.

FIG. 8 is a scanning electron micrograph (SEM) of the hard carbon prepared in Embodiment 2. As can be seen from FIG. 8, the hard carbon prepared in accordance with the preparation method in the present application has a regular shape and a homogeneous size.

Figure 9:
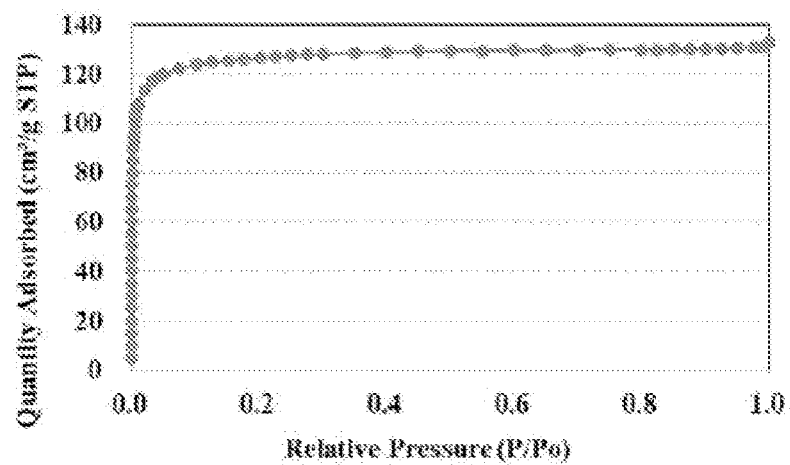
FIG. 9 is a nitrogen adsorption isotherm determined at a temperature of 77 K for the hard carbon prepared in Embodiment 2.
Figure 10:
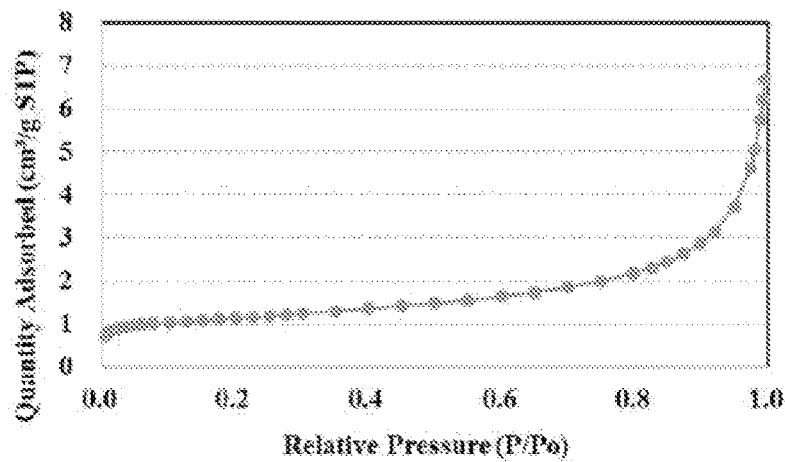
FIG. 10 is a nitrogen adsorption isotherm determined at a temperature of 77 K for the hard carbon prepared in Comparative Embodiment 1.

FIG. 9 and FIG. 10 are nitrogen adsorption isotherms determined at a temperature of 77 K for the hard carbon prepared in Embodiment 2 and Comparative Embodiment 1, respectively.

As shown in FIG. 9, a nitrogen adsorption isotherm determined at a temperature of 77 K for the hard carbon prepared in Embodiment 2 satisfies the type I adsorption isotherm in FIG. 1, a total quantity of adsorbed nitrogen under a relative pressure $P/P_0$ of nitrogen between $10^{-8}$ and 0.035 is 117.1 $cm^3$ (STP)/g, and a total quantity of adsorbed nitrogen under a relative pressure $P/P_0$ of nitrogen between 0.035 and 1 is 15.5 $cm^3$ (STP)/g satisfying: $V_2/V_1 \leq 0.20$. As can be seen from the test results in Table 2, the hard carbon prepared in Embodiment 2 has the gram capacity of 403 mAh/g, and the first coulomb efficiency of 85.4%. While the mechanism is still unclear, the inventor infers that a possible reason is that the hard carbon prepared in Embodiment 2 has an appropriate and developed pore channel structure, can provide many active ion storage sites, and thus has a high gram capacity. Further, due to the developed pore channel structure of the hard carbon, the active ions stored at the active ion storage sites may easily be deintercalated, so that the hard carbon has a high first coulomb efficiency.

In Comparative Embodiment 1, a corn starch was directly carbonized in an inert atmosphere at a high temperature after a low-temperature heat treatment process in an inert atmosphere. As shown in FIG. 10, the nitrogen adsorption isotherm determined at a temperature of 77 K for the hard carbon prepared in Comparative Embodiment 1 does not satisfy the type I adsorption isotherm in FIG. 1, but is similar to the type II adsorption isotherm in FIG. 1. The nitrogen adsorption isotherm determined at the temperature of 77 K for the obtained hard carbon does not satisfy $V_2/V_1 \leq 0.20$ or $20 \leq V_1 \leq 150$. As can be seen from the test results in Table 2, the hard carbon prepared in Comparative Embodiment 1 has the gram capacity of only 251 mAh/g, and the first coulomb efficiency of only 77.7%. The possible reasons are that the hard carbon prepared in Comparative Embodiment 1 has few micropore structures, fails to provide many active ion storage sites, and has a low utilization of the few active ion storage sites. Further, large-sized pores (e.g., mesopore or macropore structure) in the hard carbon prepared in Comparative Embodiment 1 account for a very high proportion. After the hard carbon was prepared into a secondary battery, an electrolyte solution infiltrated region inside the hard carbon accounted for a very high proportion, thereby further reducing the utilization of the active ion storage sites.

In Comparative Embodiment 2 and Comparative Embodiment 3, a corn starch was directly carbonized in an inert atmosphere at a high temperature after a low-temperature heat treatment process in an air atmosphere. The resulting hard carbon fails to have both high gram capacity and high first coulomb efficiency. The possible reasons are that the hard carbon prepared in Comparative Embodiment 2 and Comparative Embodiment 3 has few micropore structures, fails to provide many active ion storage sites, and has a low utilization of the few active ion storage sites. Further, large-sized pores in the hard carbon prepared in Comparative Embodiment 2 and Comparative Embodiment 3 account for a very high proportion. After the hard carbon was prepared into a secondary battery, an electrolyte solution infiltrated region inside the hard carbon accounted for a very high proportion, thereby further reducing the utilization of the active ion storage sites.

In Comparative Embodiments 4-6, a corn starch was subjected to a low-temperature heat treatment process in an inert atmosphere, two low-temperature heat treatment processes in air atmosphere, and a high-temperature carbonization process in an inert atmosphere. However, the heat treatment temperature and the heat treatment time were unreasonable, such that the adsorption isotherm of the obtained hard carbon fails to satisfy both $V_2/V_1 \leq 0.20$ and $20 \leq V_1 \leq 150$, and further, the obtained hard carbon fails to have both high gram capacity and high first coulomb efficiency.

In Comparative Embodiment 4, when the hard carbon was prepared, the heat treatment time in the air atmosphere was very long. In this case, excessive pores were formed in the hard carbon, such that the pore channel structure of the hard carbon may be easily collapsed and cause pore merging, thus increasing the number and proportion of large-sized pores inside the hard carbon. After the hard carbon was prepared into a secondary battery, the proportion of an electrolyte solution infiltrated region inside the hard carbon was increased, and the utilization of the active ion storage sites was decreased, such that the hard carbon can hardly have both high gram capacity and high first coulomb efficiency.

In Comparative Embodiment 5, a very low third temperature T3 was used when the hard carbon was prepared, thus resulting in a large number of extremely tiny pore structures in the obtained hard carbon. These extremely tiny pore structures have a low strength and may be easily damaged or collapsed, thus resulting in pore merging, and increasing the number and proportion of large-sized pores inside the hard carbon. After the hard carbon was prepared into a secondary battery, the proportion of the electrolyte solution infiltrated region inside the hard carbon was increased, and the utilization of the active ion storage sites was decreased, so that the hard carbon can hardly have a high gram capacity and a high first coulomb efficiency.

In Comparative Embodiment 6, when the hard carbon was prepared, a very high third temperature T3 was used, and micromotion of the graphite microcrystalline structure formed in the carbonization process tended to occur, such that the pore channel structure of the hard carbon was forced to be adjusted, the number of pore channel structures was significantly reduced, and then the hard carbon can hardly have both high gram capacity and high first coulomb efficiency.

As can be seen from the test results of Embodiments 1-20, when the nitrogen adsorption isotherm determined at a temperature of 77 K for the hard carbon satisfies both $V_2/V_1 \leq 0.20$ and $20 \leq V_1 \leq 150$, the hard carbon has both high capacity and high first coulomb efficiency. As can be further seen from the test results of Embodiments 1-20, when the nitrogen adsorption isotherm determined at a temperature of 77 K for the hard carbon further satisfies $0.08 \leq V_2/V_1 \leq 0.20$, $70 \leq V_1 \leq 150$, and $6 \leq V_2 \leq 30$, the capacity and the first coulomb efficiency of the hard carbon are further improved.

It should be noted that the present application is not limited to the above embodiments. The above embodiments are merely exemplary, and embodiments having substantially the same technical idea and the same effects within the scope of the technical solutions of the pre sent application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also encompassed within the scope of the present application.

TABLE 1

| No. | Carbon source | Low-temperature heat treatment | | | | Two low-temperature heat treatments | | | | High-temperature carbonization | | | |
|---|---|---|---|---|---|---|---|---|---|---|---|---|---|
| | | T1 (° C.) | t1 (h) | Heating rate (° C./min) | Heat treatment atmosphere | T2 (° C.) | t2 (h) | Heating rate (° C./min) | Heat treatment atmosphere | T3 (° C.) | t3 (h) | Heating rate (° C./min) | Heat treatment atmosphere |
| Embodiment 1 | Corn starch | 300 | 18 | 5 | $N_2$ | 300 | 2 | 3 | Air | 1,100 | 12 | 5 | $N_2$ |
| Embodiment 2 | Corn starch | 240 | 36 | 3 | $N_2$ | 300 | 2 | 3 | Air | 1,200 | 12 | 5 | $N_2$ |
| Embodiment 3 | Corn starch | 220 | 36 | 3 | $N_2$ | 300 | 2 | 3 | Air | 1,200 | 12 | 5 | $N_2$ |
| Embodiment 4 | Corn starch | 180 | 60 | 3 | $N_2$ | 300 | 2 | 3 | Air | 1,200 | 12 | 5 | $N_2$ |
| Embodiment 5 | Corn starch | 240 | 36 | 3 | $N_2$ | 270 | 10 | 3 | Air | 1,200 | 12 | 5 | $N_2$ |
| Embodiment 6 | Corn starch | 240 | 36 | 3 | $N_2$ | 290 | 5 | 3 | Air | 1,200 | 12 | 5 | $N_2$ |
| Embodiment 7 | Corn starch | 240 | 36 | 3 | $N_2$ | 320 | 1 | 3 | Air | 1,200 | 12 | 5 | $N_2$ |
| Embodiment 8 | Corn starch | 240 | 36 | 3 | $N_2$ | 350 | 1 | 3 | Air | 1,200 | 12 | 5 | $N_2$ |
| Embodiment 9 | Corn starch | 240 | 36 | 3 | $N_2$ | 300 | 8 | 3 | Air | 1,200 | 12 | 5 | $N_2$ |
| Embodiment 10 | Corn starch | 240 | 36 | 3 | $N_2$ | 300 | 2 | 3 | Air | 1,000 | 12 | 1 | $N_2$ |
| Embodiment 11 | Corn starch | 240 | 36 | 3 | $N_2$ | 300 | 2 | 3 | Air | 1,100 | 12 | 1 | $N_2$ |
| Embodiment 12 | Corn starch | 240 | 36 | 3 | $N_2$ | 300 | 2 | 3 | Air | 1,300 | 8 | 10 | $N_2$ |
| Embodiment 13 | Corn starch | 240 | 36 | 3 | $N_2$ | 300 | 2 | 3 | Air | 1,400 | 6 | 10 | $N_2$ |
| Embodiment 14 | Corn starch | 240 | 36 | 3 | $N_2$ | 300 | 2 | 3 | Air | 1,500 | 4 | 10 | $N_2$ |
| Embodiment 15 | Corn starch | 240 | 36 | 3 | $N_2$ | 300 | 2 | 3 | Air | 1,600 | 1 | 10 | $N_2$ |
| Embodiment 16 | Cellulose | 220 | 36 | 3 | $N_2$ | 300 | 4 | 3 | Air | 1,200 | 12 | 1 | $N_2$ |
| Embodiment 17 | Polyaniline | 220 | 36 | 3 | $N_2$ | 300 | 4 | 3 | Air | 1,300 | 12 | 1 | $N_2$ |
| Embodiment 18 | Polypyrrole | 220 | 36 | 3 | $N_2$ | 300 | 4 | 3 | Air | 1,300 | 12 | 1 | $N_2$ |
| Embodiment 19 | Phenolic resin | 240 | 36 | 3 | $N_2$ | 350 | 2 | 3 | Air | 1,400 | 12 | 5 | $N_2$ |
| Embodiment 20 | Epoxy resin | 240 | 36 | 3 | $N_2$ | 350 | 2 | 3 | Air | 1,200 | 12 | 5 | $N_2$ |
| Comparative Embodiment 1 | Corn starch | 240 | 36 | 3 | $N_2$ | / | / | / | / | 1,200 | 12 | 5 | $N_2$ |
| Comparative Embodiment 2 | Corn starch | 240 | 36 | 3 | Air | / | / | / | / | 1,200 | 12 | 5 | $N_2$ |
| Comparative Embodiment 3 | Corn starch | / | / | / | / | 300 | 2 | 3 | Air | 1,200 | 12 | 5 | $N_2$ |
| Comparative Embodiment 4 | Corn starch | 240 | 36 | 3 | $N_2$ | 300 | 24 | 3 | Air | 1,200 | 12 | 5 | $N_2$ |
| Comparative Embodiment 5 | Corn starch | 240 | 36 | 3 | $N_2$ | 300 | 2 | 3 | Air | 800 | 12 | 5 | $N_2$ |
| Comparative Embodiment 6 | Corn starch | 240 | 36 | 3 | $N_2$ | 300 | 2 | 3 | Air | 2,000 | 12 | 1 | $N_2$ |

TABLE 2

| No. | $V_1$ cm$^3$(STP)/g | $V_2$ cm$^3$(STP)/g | $V_2/V_1$ | $I_d/I_g$ | Gram capacity of hard carbon (mAh/g) | First coulomb efficiency of hard carbon (%) |
|---|---|---|---|---|---|---|
| Embodiment 1 | 64.4 | 12.3 | 0.191 | 1.248 | 313 | 80.3 |
| Embodiment 2 | 117.1 | 15.5 | 0.132 | 1.262 | 403 | 85.4 |
| Embodiment 3 | 70.4 | 11.9 | 0.170 | 1.236 | 327 | 82.0 |
| Embodiment 4 | 37.5 | 7.4 | 0.198 | 1.215 | 302 | 80.1 |
| Embodiment 5 | 87.4 | 7.4 | 0.085 | 1.205 | 347 | 86.2 |
| Embodiment 6 | 104.8 | 12.5 | 0.119 | 1.236 | 383 | 84.7 |
| Embodiment 7 | 98.5 | 15.9 | 0.162 | 1.274 | 367 | 82.0 |
| Embodiment 8 | 69.7 | 12.9 | 0.186 | 1.241 | 315 | 81.2 |
| Embodiment 9 | 102.3 | 15.8 | 0.154 | 1.294 | 381 | 83.7 |
| Embodiment 10 | 143.1 | 26.8 | 0.188 | 1.573 | 350 | 81.0 |
| Embodiment 11 | 125.3 | 19.7 | 0.157 | 1.286 | 358 | 83.5 |
| Embodiment 12 | 92.5 | 12.7 | 0.137 | 1.274 | 348 | 84.1 |
| Embodiment 13 | 73.2 | 6.9 | 0.094 | 1.237 | 328 | 85.8 |
| Embodiment 14 | 56.9 | 4.6 | 0.081 | 1.219 | 313 | 86.0 |
| Embodiment 15 | 36.9 | 2.1 | 0.056 | 1.071 | 302 | 86.5 |
| Embodiment 16 | 44.8 | 7.1 | 0.159 | 1.258 | 302 | 83.2 |
| Embodiment 17 | 101.6 | 18.7 | 0.184 | 1.295 | 374 | 80.8 |
| Embodiment 18 | 109.3 | 21.3 | 0.195 | 1.287 | 393 | 80.2 |
| Embodiment 19 | 107.5 | 20.7 | 0.192 | 1.226 | 386 | 80.1 |
| Embodiment 20 | 21.4 | 3.6 | 0.167 | 1.314 | 300 | 82.0 |
| Comparative Embodiment 1 | 0.9 | 5.8 | 6.444 | 1.243 | 251 | 77.7 |
| Comparative Embodiment 2 | 1.4 | 10.3 | 7.357 | 1.274 | 264 | 77.0 |
| Comparative Embodiment 3 | 2.1 | 16.4 | 7.810 | 1.523 | 250 | 75.0 |
| Comparative Embodiment 4 | 61.7 | 32.3 | 0.524 | 1.214 | 194 | 71.4 |
| Comparative Embodiment 5 | 172.1 | 39.8 | 0.231 | 1.472 | 265 | 58.3 |

TABLE 2-continued

| No. | $V_1$ cm³(STP)/g | $V_2$ cm³(STP)/g | $V_2/V_1$ | $I_d/I_g$ | Gram capacity of hard carbon (mAh/g) | First coulomb efficiency of hard carbon (%) |
|---|---|---|---|---|---|---|
| Comparative Embodiment 6 | 0.5 | 3.6 | 7.200 | 0.871 | 97 | 37.1 |

What is claimed is:

1. A hard carbon, wherein a total quantity of adsorbed nitrogen under a relative pressure $P/P_0$ of nitrogen between $10^{-8}$ and 0.035 is $V_1$ cm³ (STP)/g and a total quantity of adsorbed nitrogen under a relative pressure $P/P_0$ of nitrogen between 0.035 and 1 is $V_2$ cm³ (STP)/g in a nitrogen adsorption isotherm determined at a temperature of 77 K for the hard carbon, and the hard carbon satisfies: $V_2/V_1 \leq 0.20$ and $20 \leq V_1 \leq 150$, wherein P represents an actual pressure of nitrogen, and $P_0$ represents a saturated vapor pressure of nitrogen at a temperature of 77 K.

2. The hard carbon according to claim 1, wherein $50 \leq V_1 \leq 150$.

3. The hard carbon according to claim 2, wherein $70 \leq V_1 \leq 150$.

4. The hard carbon according to claim 1, wherein $0.05 \leq V_2/V_1 \leq 0.20$.

5. The hard carbon according to claim 4, wherein $0.08 \leq V_2/V_1 \leq 0.20$.

6. The hard carbon according to claim 1, wherein $4 \leq V_2 \leq 30$.

7. The hard carbon according to claim 6, wherein $6 \leq V_2 \leq 30$.

8. The hard carbon according to claim 1, wherein, in a Raman spectrum of the hard carbon, $I_d/I_g$ is in a range from 1.20 to 1.32, wherein $I_d$ represents d peak intensity of a Raman shift in a range of 1,300 cm⁻¹-1,400 cm⁻¹, and $I_g$ represents g peak intensity of the Raman shift in a range of 1,530 cm⁻¹-1,630 cm⁻¹.

9. The hard carbon according to claim 1, wherein, in an X-ray diffraction pattern of the hard carbon, a 2θ value corresponding to peak 002 is between 22° and 24°.

10. The hard carbon according to claim 1, wherein the hard carbon satisfies at least one of following conditions:
 a volumetric particle size Dv50 of the hard carbon is in a range from 2 μm to 15 μm;
 a volumetric particle size Dv90 of the hard carbon is in a range from 5 μm to 25 μm;
 a specific surface area of the hard carbon is less than or equal to 5 m²/g;
 a powder compaction density of the hard carbon under a force of 50,000 N is in a range from 0.96 g/cm³ to 1.05 g/cm³; and
 a tap density of the hard carbon is in a range from 0.80 g/cm³ to 0.95 g/cm³.

11. A method for preparing the hard carbon according to claim 1, comprising:
 providing a carbon source;
 heat treating the carbon source in an inert atmosphere at a first temperature T1 for a duration of t1 to obtain a first intermediate product;
 heat treating the first intermediate product in an air atmosphere at a second temperature T2 for a duration of t2 to obtain a second intermediate product, 180° C.≤T1<T2<400° C.; and
 carbonizing the second intermediate product in an inert atmosphere at a third temperature T3 for a duration of t3 to obtain the hard carbon.

12. The method according to claim 11, wherein T1<T3 and T2<T3.

13. The method according to claim 11, wherein:
 T1≤300° C.; and/or
 T3 is in a range from 1,000° C. to 1,600° C.

14. The method according to claim 11, wherein:
 t1 is from 4 h to 60 h; and/or
 t2 is from 1 h to 12 h; and/or
 t3 is from 1 h to 12 h.

15. The method according to claim 11, further comprising at least one of following:
 crushing the first intermediate product after heat treating the carbon source and prior to heat treating the first intermediate product;
 crushing the second intermediate product after heat treating the first intermediate product and prior to carbonizing the second intermediate product; and
 crushing the hard carbon.

16. The method according to claim 11, wherein the inert atmosphere is one or more selected from a nitrogen atmosphere and an argon atmosphere.

17. The method according to claim 11, wherein the carbon source includes one or more of a polymer, a resin, and a biomass material.

18. A secondary battery, comprising:
 a negative electrode sheet, the negative electrode sheet comprising the hard carbon according to claim 1.

19. An electrical apparatus, comprising the secondary battery according to claim 18.

* * * * *